(12) United States Patent
Kiyooka et al.

(10) Patent No.: US 12,173,791 B2
(45) Date of Patent: Dec. 24, 2024

(54) POWER TRANSMISSION UNIT

(71) Applicant: KANZAKI KOKYUKOKI MFG. CO., LTD., Amagasaki (JP)

(72) Inventors: Koji Kiyooka, Amagasaki (JP); Ryo Motooka, Amagasaki (JP); Ken Morishita, Amagasaki (JP); Hitoshi Sawada, Amagasaki (JP); Akihiro Ima, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/174,184

(22) Filed: Feb. 24, 2023

(65) Prior Publication Data

US 2023/0272851 A1    Aug. 31, 2023

(30) Foreign Application Priority Data

Feb. 25, 2022 (JP) .................................. 2022-028396
Feb. 25, 2022 (JP) .................................. 2022-028523

(51) Int. Cl.
*F16H 63/34* (2006.01)
*F16H 1/20* (2006.01)
(Continued)

(52) U.S. Cl.
CPC ............. *F16H 63/345* (2013.01); *F16H 1/20* (2013.01); *F16H 57/027* (2013.01);
(Continued)

(58) Field of Classification Search
CPC . H02K 7/102; B60K 7/007–2007/0092; F16H 63/34
See application file for complete search history.

(56) References Cited

U.S. PATENT DOCUMENTS 8,899,381 B2   12/2014   Ebihara et al.
9,263,975 B2    2/2016   Wang et al.
(Continued)

FOREIGN PATENT DOCUMENTS

EP         3770454 A1 *  1/2021  .............. B60T 1/062
JP       H08338510 A  * 12/1996  .......... F16H 57/0483

*Primary Examiner* — Ernesto A Suarez
*Assistant Examiner* — Lillian T Nguyen
(74) *Attorney, Agent, or Firm* — CANTOR COLBURN LLP

(57) ABSTRACT

[Problem] A power transmission unit that improves quietness of a gear mechanism and prevents a size of the unit from increasing when a brake rotor is installed around an input shaft of the gear mechanism.
[Solution] The power transmission unit includes an electric driving motor with a motor shaft, a gear mechanism, and an output shaft, which are accommodated in a transmission housing, wherein the power of the motor shaft is transmitted to the output shaft via the gear mechanism. The gear mechanism has a gear shaft rotatably supported on the transmission housing and a first helical gear provided on the gear shaft. The power transmission unit further includes a connecting member provided with a tubular portion fitted to the motor shaft and the gear shaft so as to allow the motor shaft and the gear shaft to synchronously rotate. The connecting member is integrally provided with a brake rotor on the outer periphery thereof.

7 Claims, 17 Drawing Sheets

(51) Int. Cl.
*F16H 57/027* (2012.01)
*F16H 57/02* (2012.01)
(52) U.S. Cl.
CPC .............. *F16H 2057/02026* (2013.01); *F16H 2057/02034* (2013.01); *F16H 2057/02056* (2013.01); *F16H 63/3458* (2013.01)

(56) References Cited

U.S. PATENT DOCUMENTS

| | | |
|---|---|---|
| 2009/0069964 A1 | 3/2009 | Wyatt et al. |
| 2014/0152075 A1* | 6/2014 | Kanatani ............. B60K 17/043 301/6.5 |
| 2016/0208684 A1* | 7/2016 | Naruoka ................ F02B 39/14 |
| 2018/0119755 A1* | 5/2018 | Sato ........................ H02K 7/10 |
| 2021/0122236 A1* | 4/2021 | Kiyooka ................ B60K 26/02 |
| 2022/0272896 A1* | 9/2022 | Kiyooka ................ A01D 34/78 |

\* cited by examiner

POWER TRANSMISSION UNIT

CROSS REFERENCE TO RELATED APPLICATIONS

The present invention claims priority under 35 U.S.C. § 119 to Japanese Application No. 2022-028523, filed on Feb. 25, 2022, and Japanese Application No. 2022-028396, filed on Feb. 25, 2022, the entire content of which is incorporated herein by reference.

TECHNICAL FIELD

The present invention relates to a power transmission unit.

BACKGROUND ART

Conventionally, in a vehicle such as a lawn mowing vehicle equipped with a mower, it has been known that wheels are driven by an electric motor so as to enable traveling. Each of Patent Documents 1 and 2 describes a lawn mowing vehicle in which right and left wheels are driven in common by an electric motor. Patent Document 3 describes a lawn mowing vehicle in which right and left wheels can be driven independently of each other, the left wheel being driven by a left electric motor and the right wheel by a right electric motor.

PRIOR ART DOCUMENT

Patent Document

Patent Document 1: U.S. Patent Application Publication No. 2009/0069964
Patent Document 2: U.S. Pat. No. 8,899,381
Patent Document 3: U.S. Pat. No. 9,263,975

SUMMARY OF INVENTION

Technical Problem

In a vehicle in which one or two motors drive the right and left wheels as described above, a power transmission unit is used to transmit the power of the motors to the wheels. In the power transmission unit, as described in Patent Document 2, a motor shaft of the motor is sometimes connected, by a joint, with an input shaft (or gear shaft) of a gear mechanism as a speed reduction mechanism so as to ensure a synchronous rotation with each other. Also, in the power transmission unit, it is conceivable that a brake rotor is provided on a shaft member as an internal member and configured to be sandwiched, on the opposite sides thereof, between friction members as pressing parts, such as brake pad, to brake the wheels. In this configuration, it is conceivable that a rotatable brake shaft is located on one side of the brake rotor and a cam surface is formed on the brake shaft, so as to enable the friction member to be pressed against the brake rotor by the cam surface. However, the configuration of simply rotating the brake shaft rotatably supported in the case to press the friction member against the brake rotor may have room for improvement in terms of a stable braking.

On the other hand, it is desirable to improve quiet performance of the gear mechanism in order to improve quietness of the vehicle. It is also desirable to prevent a size of the power transmission unit from increasing in a configuration that the brake rotor is installed around the gear shaft.

The object of the present invention is to provide a power transmission unit that has improved quiet performance of a gear mechanism and prevents a size of the unit from increasing when a brake rotor is installed around an input shaft of the gear mechanism. Also, the object of the present invention is to provide a power transmission unit capable of ensuring more stable braking.

Solution to Problem

The power transmission unit of the present invention includes a motor with a motor shaft, a gear mechanism, and an output shaft, which are accommodated in a case, in which power of the motor shaft is transmitted to the output shaft via the gear mechanism; wherein the gear mechanism includes a gear shaft rotatably supported on the case, and a first helical gear provided on the gear shaft; the power transmission unit further comprising a connecting member provided with a tubular portion fitted to the motor shaft and the gear shaft so as to allow the motor shaft and the gear shaft to synchronously rotate; wherein the connecting member is integrally provided on the outer periphery thereof with a brake rotor. The power transmission unit of the present invention includes a motor with a motor shaft, a gear mechanism, and an output shaft, which are accommodated in a case, in which power of the motor shaft is transmitted to the output shaft via the gear mechanism; the power transmission unit further comprising a brake chamber formed at a location where a gear shaft of the gear mechanism faces the motor shaft; a brake rotor disposed in the brake chamber and fitted to an outside of a shaft member in a non-rotatable manner relative to the shaft member, the shaft member being one or both of the motor shaft and the gear shaft; a friction member disposed at one side of the brake rotor and capable of contacting with and separating from the brake rotor; a brake shaft rotatably supported on the case and disposed opposite to the brake rotor with respect to the friction member, the brake shaft provided with a cam surface capable of pressing the friction member toward the brake rotor; and a brake holder fixed to the case and disposed opposite to the friction member with respect to the brake shaft, the brake holder receiving reaction force of the brake shaft when the cam surface acts to press the friction member.

Advantageous Effects of Invention

According to the power transmission unit of the present invention, the first helical gear on the gear shaft as an input shaft of the gear mechanism and the other helical gear meshing with the first helical gear constitute a helical gear train, so that it is possible to improve the quiet performance of the gear mechanism. Although thrust force is generated when the helical gears are driven to rotate, the thrust force is absorbed by the connecting member and does not move the motor shaft in the axial direction because the helical gears are driven through the connecting member with respect to the motor shaft. Further, since the brake rotor is integrally provided on the outer periphery of the connecting member fitted to the motor shaft and the gear shaft, it is possible to prevent the overall length of the connecting portion of the motor shaft and the gear shaft from increasing. Consequently, it is possible to prevent the size of the power transmission unit from increasing when the brake rotor is installed around the input shaft. Furthermore, according to the power transmission unit of the present invention, the brake holder is disposed opposite to the friction member with respect to the brake shaft, the brake holder fixed to the case and receiving the reaction force of the brake shaft against the friction member, so that it is possible to realize a configuration in which the rotatable brake shaft stably presses the friction member against the brake rotor. Thus, it is possible to accomplish a more stable braking action.

In the above power transmission unit, the gear mechanism may include a second helical gear meshing with the first helical gear; and an intermediate gear shaft engaged with an inner periphery of the second helical gear, the intermediate gear shaft being axially displaceable relative to the second helical gear and non-rotatable relative to the second helical gear; and the power transmission unit further includes a pair of thrust receiving members provided at portions of the case so as to face axial one and other end surfaces of the second helical gear, and supported on the case in a non-rotatable manner, the thrust receiving members being made of a material harder than a material of the case. The above power transmission unit may further include a brake chamber provided inside the case at a location where the gear shaft faces the motor shaft, the brake chamber forming a lubricating oil reservoir; a tubular portion fitted to the outside of the shaft member in a non-rotatable manner relative thereto, the brake rotor being integrally formed on an outer periphery of the tubular portion; a brake rotor receiving area formed on one sidewall surface of the case located inside the brake chamber, the brake rotor receiving area provided with a depression larger than an outer diameter of the brake rotor as well as an axial length of the tubular portion; and a through hole formed in the brake holder and having an inner diameter at least allowing the motor shaft to be inserted therethrough; wherein the brake holder may be mounted on the sidewall surface so as to cover the brake rotor receiving area, and an outer periphery of the brake rotor receiving area may be partially opened to the brake chamber through an aperture.

According to the above configuration, when the second helical gear is axially displaced relative to the intermediate gear shaft due to a meshing action in the helical gear train, it is possible to prevent the second helical gear from butting against the case accommodating the second helical gear to make a frictional contact, so that it is possible to prevent the case from being worn. According to the above configuration, since the brake rotor receiving area is covered by the brake holder, it is possible to restrict the amount of oil in contact with the brake rotor. Consequently, it is possible to reduce the churning amount of oil and decrease the resistance to stirring the oil, and thus to reduce the energy loss in the power transmission unit. Furthermore, when the brake rotor rotates, the surrounding oil blows out, through an aperture formed for an insertion of the brake shaft at the open position of the brake rotor receiving area, into the motor adjacent area of the brake chamber due to centrifugal action. The blown oil merges with the oil in the motor adjacent area. The oil blowing out creates a nearly negative pressure in the brake rotor receiving area, whereby the oil in the motor adjacent area is drawn through a gap between the central aperture of the brake holder and the tubular portion into the brake rotor receiving area. Consequently, the oil is allowed easy to circulate while contacting the brake rotor, which facilitates the heat dissipation of the brake rotor.

In the above power transmission unit, one end of the intermediate gear shaft may be inserted into and supported on a wall of the case; and one of the pair of thrust receiving members may have a plate-shaped body portion that is fitted to the one end of the intermediate gear shaft and interposed between the case and the second helical gear. The above power transmission unit may further include a case through hole provided on an upper side of the brake chamber; and an air breather attached to an outer end opening of the case through hole; wherein a part of the brake holder is opposed to an inner end opening of the case through hole with a gap therebetween.

According to the above configuration, it is not necessary to provide a special machining or a dedicated component for supporting the thrust receiving member on the case. According to the above configuration, it is also possible to prevent the oil in the brake chamber from scattering to enter deep within the case through hole. Therefore, it is possible to ensure the long-term reliability of the air breather.

The above power transmission unit may further include a gear case accommodating the gear mechanism and including the brake chamber; a motor case accommodating the motor, the gear case and the motor case being included by the said case and capable of separating from and joined to each other; and a motor case mounting surface provided in the gear case and facing toward a same direction as the sidewall surface of the brake chamber; wherein a part of the motor case extending from the motor case mounting surface into the brake chamber constitutes the brake holder.

According to the above configuration, the brake holder is formed by a part of the motor case. Consequently, it is not necessary to provide a brake holder as a component separate from the motor case, and thus it is possible to decrease the number of components and thereby reduce the manufacturing cost of the power transmission unit.

In the above power transmission unit, one of the pair of thrust receiving members may have a bent portion bent toward the second helical gear on a peripheral edge portion extending outwardly beyond an outer periphery of the second helical gear; and the bent portion is disposed opposite to a part of an outer peripheral surface of the second helical gear.

According to the above configuration, in a state where one thrust receiving member is prevented from rotating, and in a configuration that the gear lubrication oil is contained in the case, it is possible to suppress the energy loss of the power transmission unit from increasing due to resistance to stirring, applied from the oil to the second helical gear and other gears, when the oil is stirred by the rotation of the second helical gear.

DESCRIPTION OF EMBODIMENTS

Figure 1:
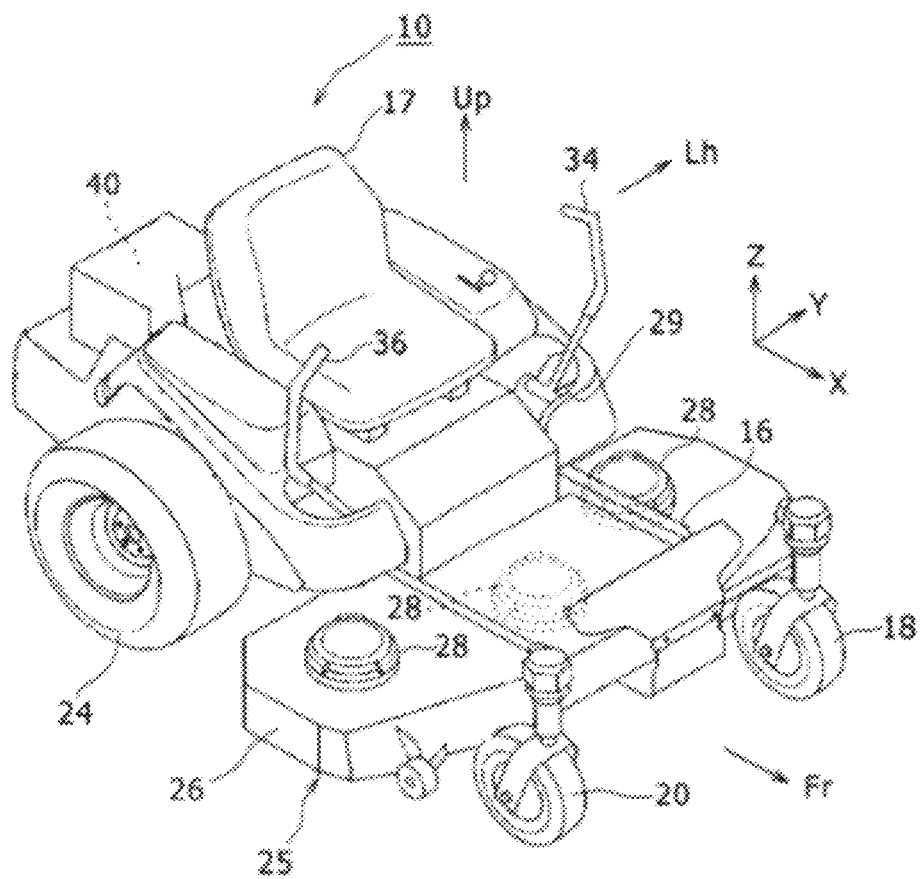
FIG. 1 is a perspective view of a vehicle equipped with a power transmission unit according to an embodiment of the present invention.

The embodiments of the present invention are described below in detail, with reference to accompanying drawings. The following description is directed to a configuration in which a power transmission unit is installed on a lawn mowing vehicle as a working vehicle. However, a vehicle on which a power transmission unit is installed is not limited thereto, but may be other working vehicle equipped with a working machine performing at least one of snow removal, excavation, civil engineering and agricultural works; or an off-road type utility vehicle (UV) having a cargo bed and traveling on an uneven terrain; or an all-terrain vehicle (ATV) called a buggy; or a recreational vehicle (RV); or a recreational off-highway vehicle (ROV). The following description is also directed to a vehicle in which two motors drive two rear wheels. However, a vehicle may have a configuration in which two motors drive two front wheels. The following description is also directed to a configuration using a left-right lever-type manipulator having right and left control levers. However, this is merely an exemplary configuration, but a steering handle may be used as a steering device and an accelerator pedal installed in front of a seat may be used as an accelerator device. In the following description, the same or similar components in all drawings are denoted by the same reference symbols or numerals.

First Embodiment

FIGS. 1 through 10 depict the first embodiment. In the drawings described below, a longitudinal (or front-back) direction is denoted by "X", a horizontal (or left-right) direction is denoted by "Y", and a vertical (or up-down) direction is denoted by "Z". Further, a front side is denoted by "Fr", a left side is denoted by "Lh", and an upper side is denoted by "Up". X, Y, and Z are mutually orthogonal.

First, the overall configuration of a lawn mowing vehicle 10 will be described as an example of a vehicle equipped with the power transmission unit of the present invention, and thereafter a power transmission unit 41 (FIG. 2) installed on the lawn mowing vehicle 10 is described in detail. The lawn mowing vehicle 10 of a non-engine, ride-on type includes a main frame 16 constituting a body, two casters 18, 20 as right and left front wheels, two wheels 24 as right and left rear wheels, a mower 25 as a working machine, right and left control levers 34, 36, and a power supply unit (prime mover) 40 including a battery. Note that a left wheel is not depicted in FIG. 1.

Figure 3:
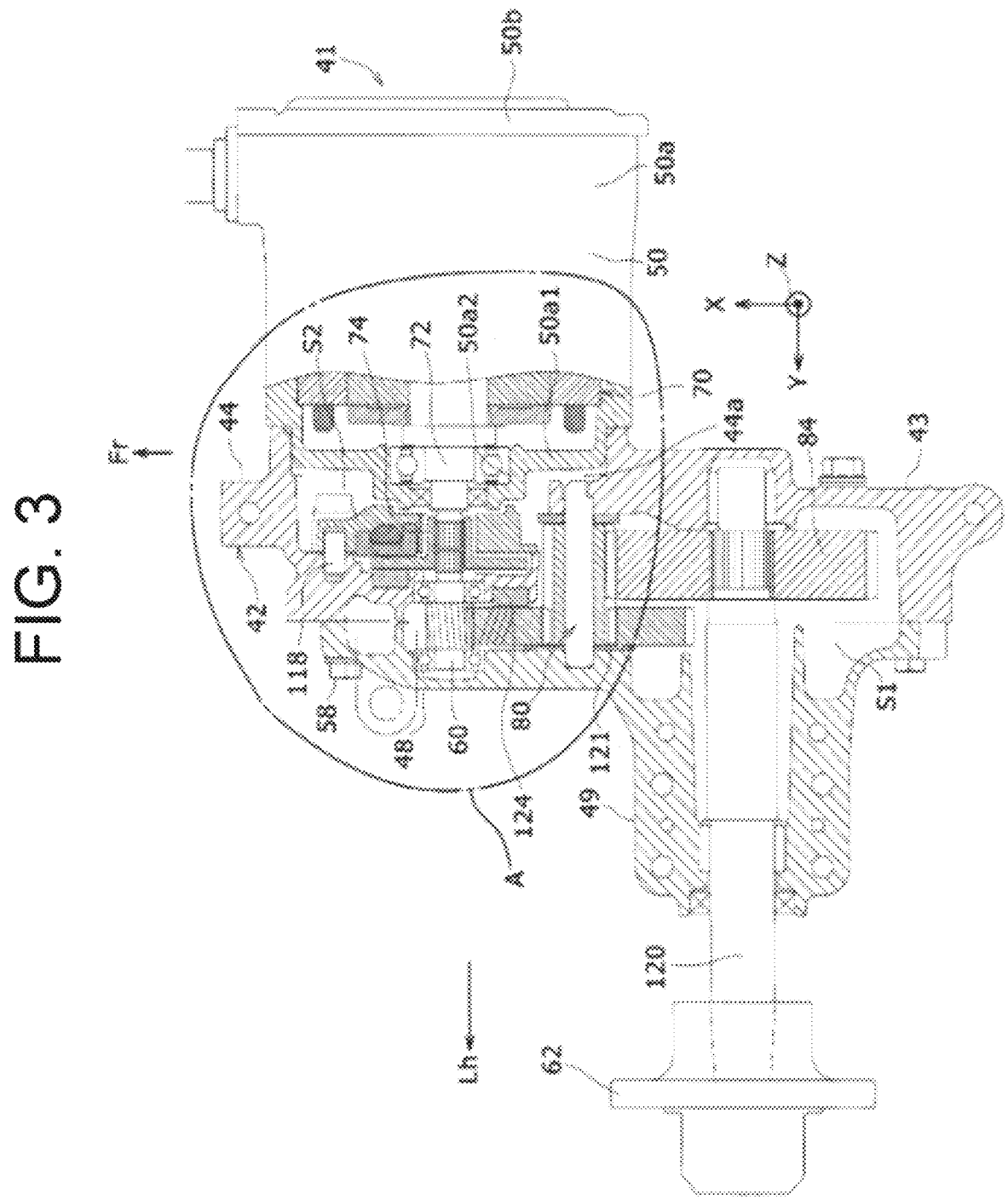
FIG. 3 is a partial sectional view depicting the power transmission unit of FIG. 2.

A driver's seat 17 is fixed to the main frame 16 above a middle point thereof in the longitudinal direction. The right and left casters 18, 20 are supported on the front side of the main frame 16. Each caster 18, 20 allows free steering of more than 360 degrees around a vertical axis. The right and left wheels 24 are supported on the rear side of the main frame 16. The right and left wheels 24 are main drive wheels and driven by right and left electric traveling motors 70 through the control levers 34,36 for traveling, as described below (FIG. 3).

Only one caster or three or more casters, for example, may be provided for the lawn mowing vehicle 10, in place of two casters 18, 20. The casters and the drive wheels may be reversed as regards the illustrated front-and-rear configuration.

The mower 25 is supported on the main frame 16 below the middle point thereof in the longitudinal direction. The mower 25 includes a mower deck 26 and three cutting blades (not depicted) as rotary tools for mowing, each rotatable around a vertical axis inside the mower deck 26. The cutting blade rotates to cut lawn grass, etc., to enable mowing. Each cutting blade is driven by a electric mowing motor 28.

The rotation of the cutting blades makes it possible to mow the lawn grass, and the mowed grass is discharged from the inside of the mower deck 26 to one lateral side of the vehicle.

The mower 25 may be configured to include, as a rotary tool for mowing, a mowing reel driven by the mowing motor, in which a spiral blade, for example, is arranged on a cylinder with a rotation axis parallel to a ground surface, so as to pinch and mow the lawn grass, etc.

The right and left control levers 34, 36 are provided on both lateral sides of the driver's seat 17 and capable of swing back and forth about a horizontal axis oriented in the horizontal direction. When the lower portion of each control lever 34, 36 is in the upright, neutral state, the traveling motor 70 stops rotating. When the control lever 34(36) is operated to swing, the traveling motor 70 arranged at a side corresponding to the swung lever is instructed to rotate according to the direction and amount of swinging. By operating the left and right control levers 34,36, the operator can make the mowing vehicle 10 go straight, change the direction of travel, and turn on the spot.

The back and forth swinging position of the control lever 34, 36 is detected by a lever sensor (not depicted). The detection signal of the lever sensor is input to a controller (not depicted) installed in the vehicle, which is a signal indicating a rotation instruction for the traveling motor 70, and the controller makes the motor 70 to rotate in a direction according to the instruction. The power of each motor 70 is transmitted to each of the right and left wheels 24 via a gear mechanism 80 (FIG. 3), etc., of the power transmission unit 41 (FIG. 2) as described below. Thus, the vehicle travels frontward or backward depending on the operation of the control levers 34, 36. When differentiating the amount of operation between the right and left control levers 34, 36, a difference in rotational speed is generated between the right and left wheels 24 and thereby the vehicle turns. Furthermore, when one of the two control levers 34, 36 is operated to tilt frontward and the other is operated to tilt backward, the right and left wheels 24 rotate in opposite directions, which decreases a turning radius and causes the vehicle to sharply turn. The motor 70 is equipped with a rotation sensor or a position sensor (not depicted), which feeds back a motor rotation signal to the aforementioned controller.

Furthermore, the control levers 34, 36 are configured to be able to tilt from an upright neutral position to open laterally outward in the horizontal (or width) direction of vehicle, in which a tilted position is defined as a parking brake position. Each of the control levers 34, 36 functions to indicate the activation of a parking brake, upon shifting to the parking brake position. The vehicle may be configured to have T-shaped guide holes (not depicted) in the upper part of the body to guide the shifting of the control levers 34, 36, so that each of the control levers 34, 36 can be opened laterally outward in the vehicle horizontal direction, from only a state where the control levers 34, 36 are in an upright position. The bottom end of each control lever 34, 36 is connected with a brake system 90 (described below) in the power transmission unit 41 by a link mechanism. Thus, when the control lever 34, 36 opens outward, the brake system 90 is activated to brake the corresponding wheel 24.

The overall configuration of the lawn mowing vehicle 10 is described above. Then, the power transmission unit 41 (FIG. 2) installed on the lawn mowing vehicle 10 is described below. The right power transmission unit is connected to the right wheel 24, and the left power transmission unit 41 is connected to the left wheel. The structure of the right power transmission unit is similar to that of the left power transmission unit 41, except for a mutually symmetrical configuration with respect to the center of the vehicle in the horizontal direction.

Figure 2:
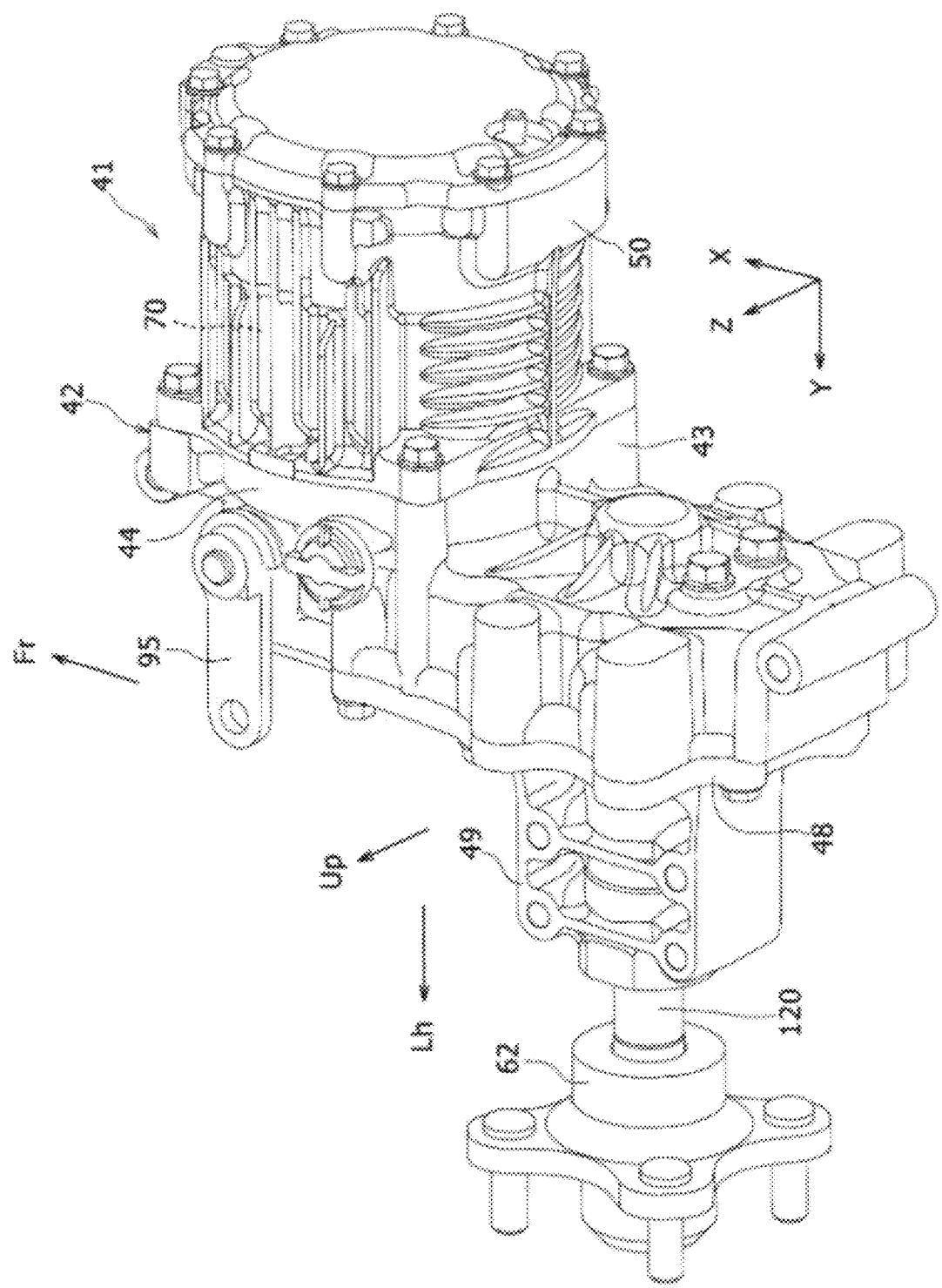
FIG. 2 is a perspective view of the power transmission unit according to the embodiment, provided for a left wheel of the vehicle of FIG. 1.
Figure 4:
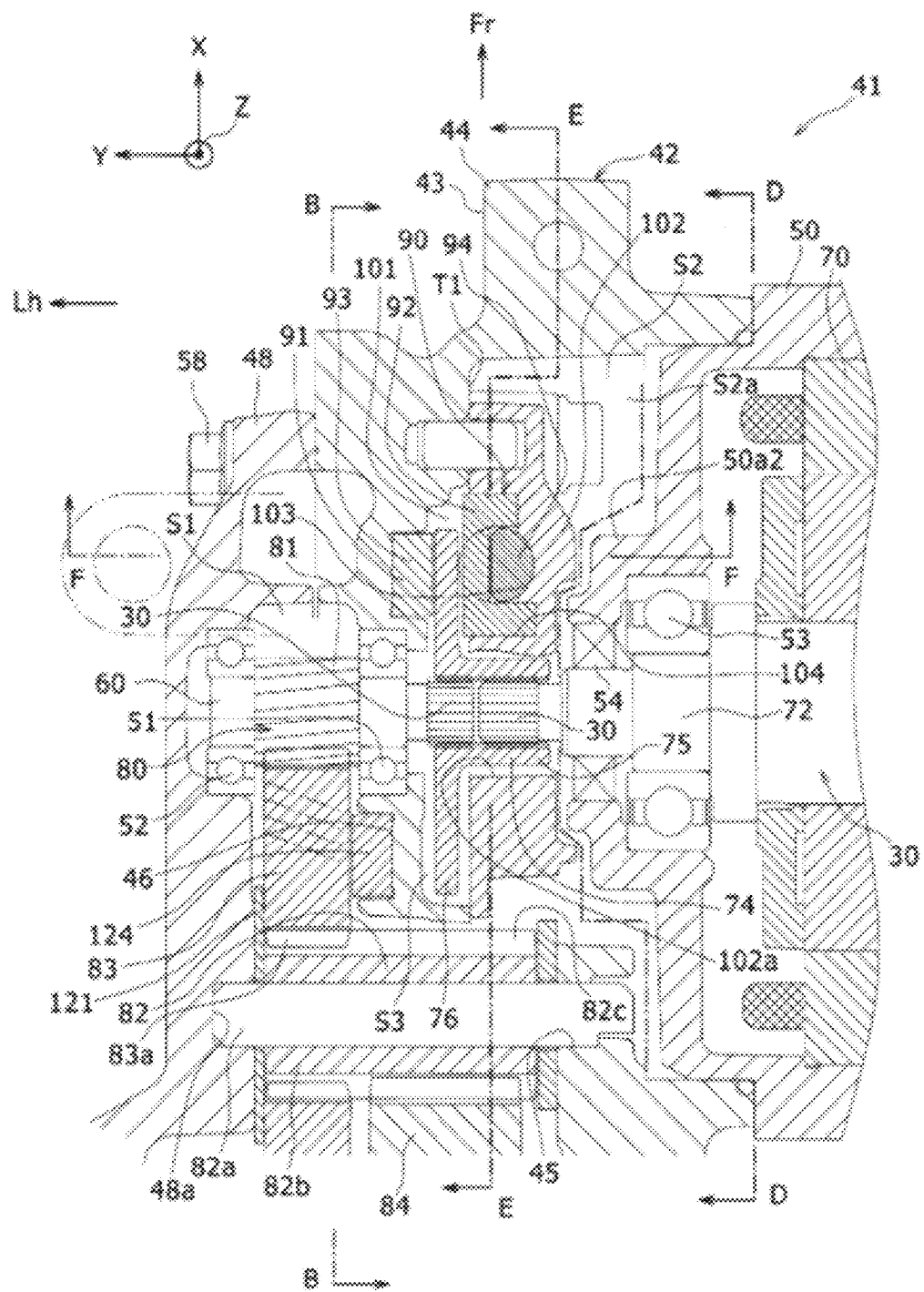
FIG. 4 is an enlarged view of part A of FIG. 3.

FIG. 2 is a perspective view of the power transmission unit 41 provided for the left wheel. FIG. 3 is a partial sectional view depicting the power transmission unit 41 of FIG. 2. FIG. 4 is an enlarged view of part A of FIG. 3. The power transmission unit 41 is formed by integrally assembling a transmission housing 42, the motor 70 for traveling, the gear mechanism 80, and an output shaft 120 together. The transmission housing 42 is formed by combining a gear case 43 and a motor case 50.

The gear case 43 accommodates an input shaft 60, the output shaft 120, and the gear mechanism 80 in the interior of the case. The input shaft 60 corresponds to a gear shaft. The gear mechanism 80 transmits power between the input shaft 60 and the output shaft 120 and transmits power from the input shaft 60 to the output shaft 120 at a reduced speed. The input shaft 60 and the output shaft 120 are disposed in parallel. The input shaft 60 is connected to a motor shaft 72 of the motor 70 and rotates in synchronization with the motor shaft 72, as described below.

The gear case 43 has an integrated structure in which a first case 44 as axially one part, which forms an inner part in the vehicle horizontal direction (i.e., a right part in FIG. 4), is joined to a second case 48 as axially another part, which forms an outer part in the vehicle horizontal direction (i.e., a left part in FIG. 4), with a plurality of bolts 58. Note that the axial direction of the power transmission unit 41 is parallel to the input shaft 60 and the output shaft 120 and coincides with the vehicle horizontal direction.

Figure 5:
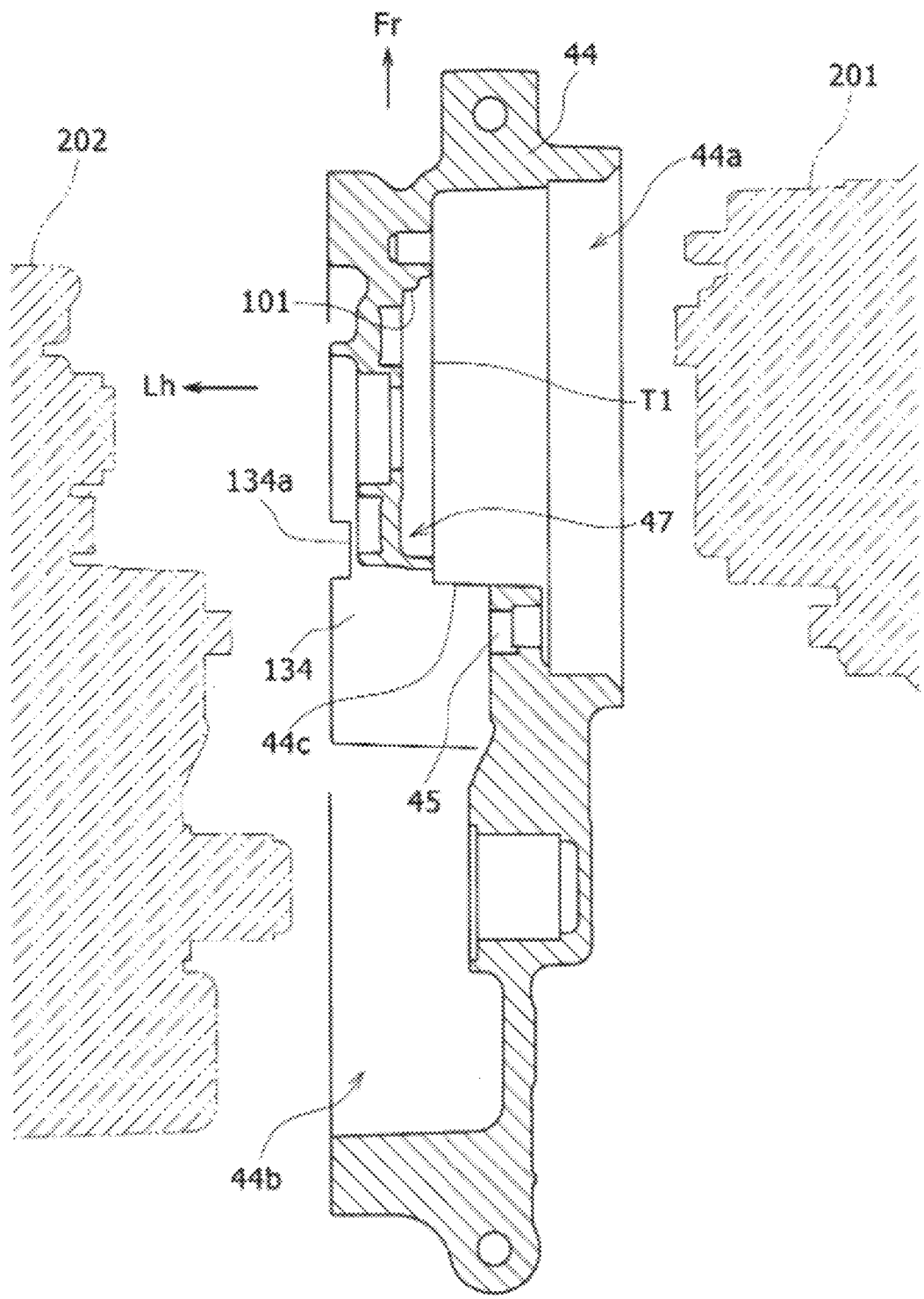
FIG. 5 is a component illustration depicting a first case constituting a gear case.

FIG. 5 is a component illustration depicting the first case 44. As depicted in FIG. 5, the first case 44 is a gear case having an opening 44*a* located at an inner side in the vehicle horizontal direction and an opening 44*b* located at an outer side in the vehicle horizontal direction. As depicted in FIGS. 3 and 4, the second case 48 includes an opening at an inner side in the vehicle horizontal direction and a tubular portion 49 extending outward in the axial direction from an outer side in the vehicle horizontal direction. The output shaft 120 passes through the tubular portion 49. The first case 44 is coupled to the second case 48 in such a manner that the outer peripheral areas of the end faces thereof in the vehicle horizontal direction are made contact with each other, and thereby the outside opening 44*b* of the first case 44 in the vehicle horizontal direction is blocked by the second case 48. Consequently, a gear chamber S1 is formed in the gear case 43, where gears of the gear mechanism 80 is disposed. On the other hand, the inside opening 44*a* of the gear case 43 in the vehicle horizontal direction is blocked by the motor case 50 as described below. Consequently, a brake chamber S2 is formed, where a brake rotor and a brake holder, described below, are disposed, the brake chamber containing end portions of the input shaft 60 and the motor shaft 72 facing each other, and encompasses a location of facing of the shafts 60, 72. As depicted in FIGS. 4 and 5, the input shaft 60 is supported on the gear case 43 by bearings 51 and 52. The bearing 51 is held by an intervening wall 47 (FIG. 5) of the first case 44, extending inward from the perimeter wall thereof, and the bearing 52 is held inside the vertical wall of the second case 48.

In the gear chamber S1, the input shaft 60, the gear mechanism 80, and the output shaft 120 are disposed. The gear case 43 is filled with an appropriate amount of oil, and an oil level is defined at a boundary with an air layer. The gear chamber 51 and the brake chamber S2 are free in fluidic communication of oil with each other as described below, and the oil is contained in the lower parts of the chambers S1 and S2. Consequently, lubrication of the gear mechanism 80 is conducted in the gear chamber S1, and cooling of the brake rotor described below is conducted in the brake chamber S2. In FIGS. 6, 8-10, the oil level is denoted by solid line "La". Air layers are formed respectively in the upper parts of the chambers S1 and S2.

The input shaft 60 and the output shaft 120 are rotatably supported on the gear case 43, respectively. The outer end portion of the output shaft 120 in the vehicle horizontal direction protrudes from the distal end of the tubular portion 49, and a hub 62 is fixed to the protruding end portion. The left wheel is fixed to the hub 62.

On the other hand, one end portion of the input shaft 60 as an inner end in the vehicle horizontal direction is connected with the motor shaft 72 of the motor 70 by a connecting member 74 as a joint. Consequently, the power of the motor 70 is transmitted from the motor shaft 72 to the input shaft 60. The power of the input shaft 60 is decelerated and transmitted to the output shaft 120 through the gear mechanism 80. Consequently, the wheels 24 rotate and the vehicle travels.

The motor case 50 accommodates the motor 70 inside and is joined and fixed to the first case 44 by bolts to block the inside opening 44*a* of the gear case 43 in the vehicle horizontal direction. The motor case 50 includes a bottomed tubular case body 50*a* whose inner end opening in the vehicle horizontal direction is closed by a cover 50*b*. A bottom plate 50*a*1 of the case body 50*a* is provided with a stepped tubular portion 50*a*2 around the center of the plate, and the motor shaft 72 passes through the interior of the tubular portion 50*a*2. A bearing 53 and a seal 54 are fixed to the inner circumferential surface of the tubular portion 50*a*2, the seal acting to prevent circulating oil in the gear case 43 from entering into the motor case 50. The input shaft 60 is rotatably supported inside the tubular portion 50*a*2 by the bearing 53.

As depicted in FIG. 4, the motor 70 is, e.g., a three-phase permanent magnet motor. The motor 70 has a motor rotor fixed to the outer circumferential surface of the motor shaft 72, a stator core facing the outer circumferential surface of the motor rotor, and a three-phase stator coil wound and arranged on the stator core. The motor rotor is provided with permanent magnets arranged at, e.g., a plurality of circumferential positions on a rotor core. The stator core is fixed inside the motor case 50. One end portion of the motor shaft 72 as an inner end in the vehicle horizontal direction is rotatably supported on the motor case 50 by a bearing (not depicted). When three-phase AC power is supplied to the stator coil from the battery, the motor shaft 72 rotates due to interaction between a rotating magnetic field generated in the stator core and a magnetic field generated by the motor rotor.

The motor shaft 72 is aligned with the input shaft 60 of the gear mechanism 80 along a common axis and connected to the input shaft 60 by the connecting member 74 with a gap defined between the axial end faces of the respective shafts. Specifically, male splines are respectively formed on the outer circumferential surface of one end portion of the motor shaft 72 and the outer circumferential surface of one end portion of the input shaft 60 facing the said end portion of the motor shaft. A tubular portion 75 of the connecting member 74 is fitted, at the axial opposite lengths thereof, to the outer circumferential surfaces of the end portions of motor shaft 72 and input shaft 60. A female spline is formed on the inner circumferential surface of the tubular portion 75 along an axial direction and engaged with the male splines on the outer circumferential surfaces of the end portions of motor shaft 72 and input shaft 60. Consequently, the motor shaft 72 and the input shaft 60 integrally rotate while excluding relative rotation, and the connecting member 74 and the input shaft 60 are axially movable relative to the motor shaft 72. The functional engagement of the motor shaft 72 and the input shaft 60 with the tubular portion 75 may also be accomplished by using a key instead of the splines.

Furthermore, a brake rotor 76 is integrally formed on the outer periphery of one end portion of the tubular portion 75 of the connecting member 74. Consequently, it is possible to prevent a size of the power transmission unit 41 from increasing in a configuration in which the brake rotor 76 is installed around the input shaft 60. This will be discussed in more detail later.

The gear mechanism 80 includes a first helical gear 81 provided on or directly formed on the input shaft 60, an intermediate gear shaft 82 disposed between the input shaft 60 and the output shaft 120 with a second helical gear 83 attached to the outer circumferential surface, and an output gear 84 fixed to the output shaft 120.

The intermediate gear shaft 82 includes an inner shaft 82*a* fixed to the gear case 43 and an outer shaft 82*b* fitted to the outer periphery of the inner shaft 82*a*, in which the outer shaft 82*b* is supported on the inner shaft 82*a* in a relatively rotatable manner. An axially wide intermediate gear part 82*c* like a spur gear is formed on the outer circumferential surface of the outer shaft 82*b*, and the output gear 84 meshes with teeth of a right-side length of the intermediate gear part 82*c*. Teeth of a left-side length of the intermediate gear part 82*c* mesh with internal teeth 83*a* formed on the inner circumferential surface of the second helical gear 83, so that the intermediate gear part 82*c* is engaged with the second helical gear 83 while excluding relative rotation.

The intermediate gear part 82*c* is not provided with any protrusion or retaining ring on the outer periphery thereof so as to allow the second helical gear 83 to be axially displaceable relative to the intermediate gear part 82*c*. Instead, the axial displacement of the second helical gear 83 is limited by a pair of thrust receiving members 121, 124 described later. The intermediate gear part 82*c* is made of sintered material that can be mass-produced at low cost. In this connection, since no stepped portion is formed on the outer periphery of the gear section 82*c* as described above, it is possible to uniform density distribution of the sintered material and maintain manufacturing quality such as hardness or intensity.

The second helical gear 83 meshes with the first helical gear 81 to form a helical gear train. The output gear 84 has more teeth than the intermediate gear part 82*c*, and the second helical gear 83 has more teeth than the first helical gear 81. Consequently, the rotation of the input shaft 60 is decelerated in two stages through the gear mechanism 80 and the decelerated rotation is transmitted to the output shaft 120.

The input shaft 60 and the output shaft 120 are rotatably supported respectively by a plurality of bearings provided in the gear case 43. One end or the left end portion of the inner shaft 82*a* of the intermediate gear shaft 82 is fitted into a recess 48*a* formed in the vertical wall of the second case 48. Other end or the right end portion of the inner shaft 82*a* is inserted into a through hole 45 formed in a wall of the first case 44 in a non-rotatable manner. The right end of the inner shaft 82*a* is machined to form a flat portion on the outer periphery thereof, so that upon fitted with a flat portion of the through hole 45, the inner shaft 82*a* is made non-rotatable.

The first helical gear 81 provided on the input shaft 60 is sandwiched between inner rings of the bearings 51, 52 on both sides. When the first helical gear 81 is driven rotationally, the axial displacement (or thrust force) of the input shaft 60 is caused correspondingly to the inherent internal clearances of the bearings 51, 52. However, the axial displacement is absorbed by the aforementioned relative sliding action of spline engagement in the connecting member 74, and thus is not transmitted to the motor shaft 72. Therefore, the motor shaft and the motor rotor are not moved in the axial direction, which prevents various detection sensors (not depicted) equipped in the motor shaft or the motor rotor from having malfunction of detection, and thus it is possible to maintain accuracy of the motor in good condition during driving.

On the other hand, the second helical gear 83 is configured to be axially displaceable relative to the intermediate gear shaft 82. In the helical gear train, meshing between the first helical gear 81 and the second helical gear 83 causes an axial thrust force during the rotation drive by the helical gears 81, 83. Consequently, the second helical gear 83 axially moves, in which the direction of movement changes in accordance with the direction of rotation of the first helical gear 81, i.e., of the motor shaft 72. The second helical gear 83 is made from a high hardness material, such as iron, steel, etc. On the other hand, the gear case 43 is made from aluminum or aluminum alloy for reduction in weight, etc., and thus has a lower hardness than the second helical gear 83. Therefore, if the second helical gear 83 axially moves and contacts the gear case 43 to cause friction therebetween, the gear case 43 may be worn.

In order to prevent such inconvenience, the illustrated embodiment has a configuration in which a pair of thrust receiving members 121, 124 are provided in the gear case 43 at locations respectively facing the axial one and other end faces of the second helical gear 83. The thrust receiving members 121, 124 are respectively supported on the gear case 43 while excluding rotation relative thereto. Specifically, one thrust receiving member 121 located outside in the vehicle horizontal direction includes a plate-shaped body portion that is fitted to one end of the intermediate gear shaft 82 and interposed between the second case 48 and the second helical gear 83.

FIG. 5 depicts dies 201, 202 for forming the first case 44 by a forging process. A metal material of the first case 44 is pressurized by the dies from right and left sides in FIG. 5 to cause plastic deformation, so that the first case 44 with openings 44a, 44b on opposite sides is formed. During this process, a stepped surface 44c is formed by the mating faces of the dies 201, 202.

Figure 6:
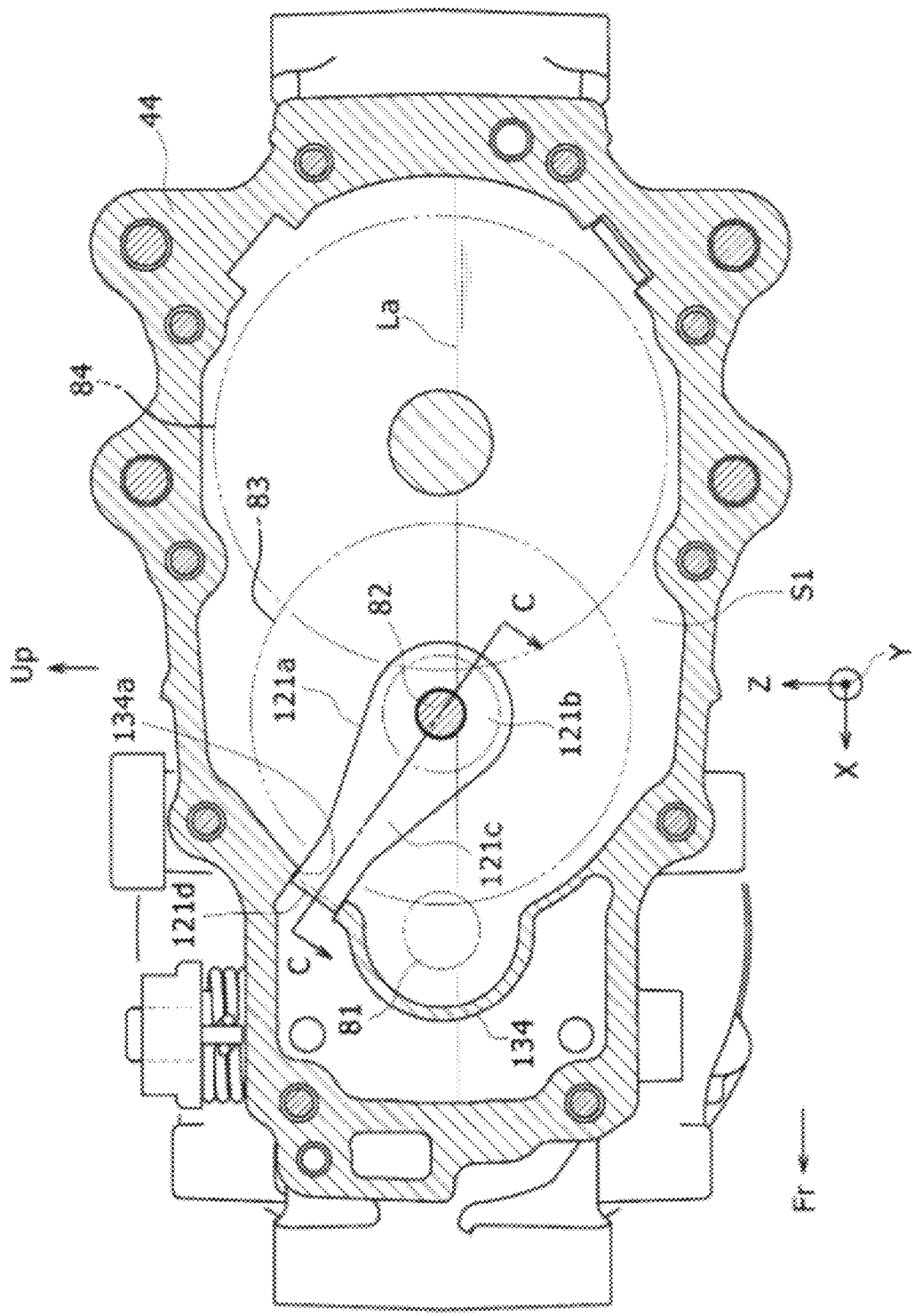
FIG. 6 is a sectional view taken along line B-B of FIG. 4.
Figure 7:
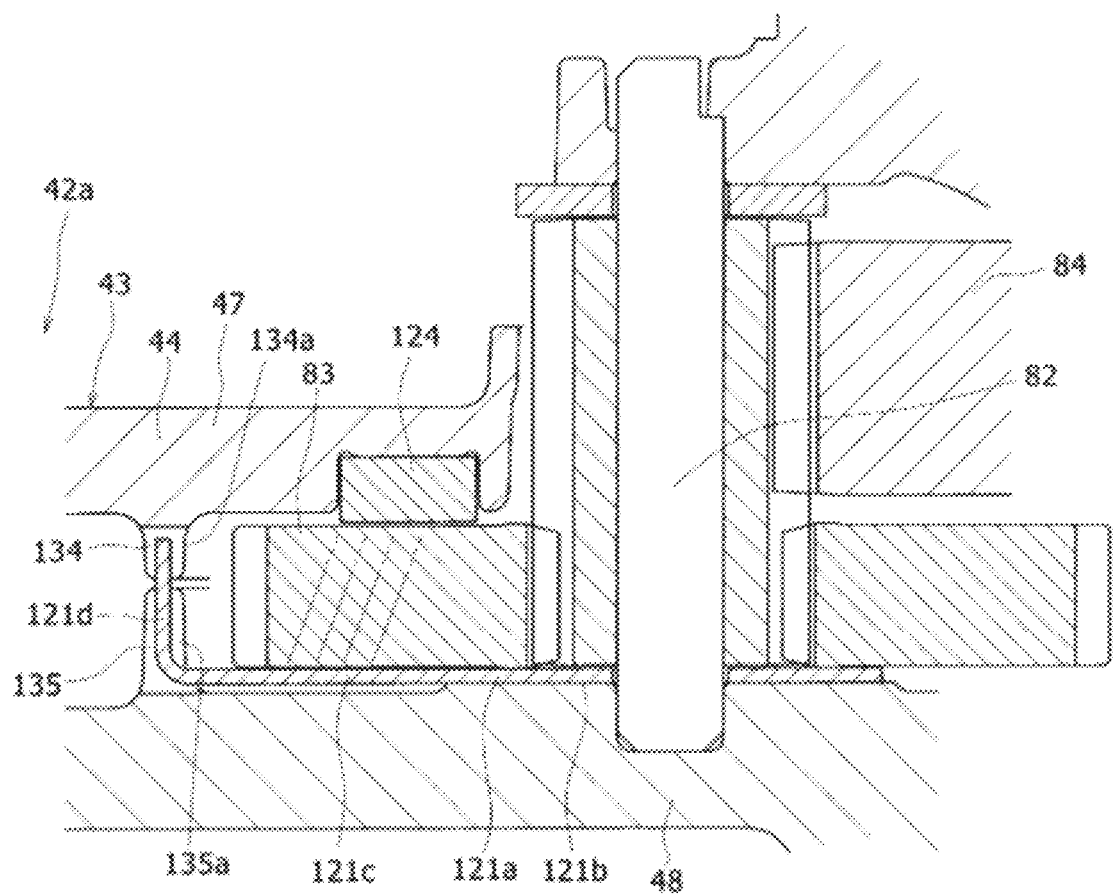
FIG. 7 is a sectional view taken along line C-C of FIG. 6.

FIG. 6 is a sectional view taken along line B-B of FIG. 4. FIG. 7 is a sectional view taken along line C-C of FIG. 6. In the pair of thrust receiving members 121, 124 facing the opposite end faces of the second helical gear 83, one thrust receiving member 121 has a body portion 121b like a disk plate as depicted in FIG. 6, which is fitted at a center hole thereof to one end portion of the intermediate gear shaft 82 and interposed between the second case 48 and the second helical gear 83. The thrust receiving member 121 also has an integral arm portion 121c extending in a direction free of interference with the first helical gear 81, the arm portion having a width that gradually decreases outward in the extension direction and becomes constant at an outer end portion in the extension direction. The thrust receiving member 121 also has a bent portion 121d on a peripheral edge portion extending outwardly beyond an outer periphery of the second helical gear 83, which is the outer end portion of the arm portion 121c in the extension direction, the bent portion being bent into parallel to the tooth width of the second helical gear 83. The bent portion 121d is fitted and caught in notches 134a, 135a partly formed in oil anti-stirring bulkheads 134, 135 provided in the gear chamber S1 of the first and second cases 44, 48. In this way, the thrust receiving member 121 is supported on the gear case 43 while excluding rotation relative thereto, and thus does not rotate with accompanying the second helical gear 83 even if the thrust receiving member comes into contact with the second helical gear. Consequently, it is not necessary to provide a special machining or a dedicated component for supporting the thrust receiving member 121 on the gear case 43.

The other thrust receiving member 124 is a pad fitted into a recess 46 formed in the lateral face of the first case 44 adjoining the second case 48, and partially protrudes from the open end of the recess 46 toward the second helical gear 83 to face the lateral face of the second helical gear 83. Each of the thrust receiving members 121, 124 is made from a material having higher hardness than the material of the gear case 43; e.g., metal such as iron, steel, etc. Consequently, it is possible to prevent the second helical gear 83 from butting against the gear case 43 accommodating the second helical gear 83 to make a frictional contact, so that it is possible to prevent the gear case 43 from being worn.

The connecting member 74 for connecting the motor shaft 72 to the input shaft 60 will be described below. As described above, the connecting member 74 includes the tubular portion 75 provided with the female spline on the inner circumferential surface. The brake rotor 76 having a single-plate shape is integrally formed on the outer periphery of one end portion of the tubular portion 75 so as to radially protrude therefrom over the whole circumference. In the illustrated example, each of the input shaft 60 and the motor shaft 72 is formed as a shaft member 30. Consequently, the brake rotor 76 is fitted to an outside of the shaft members 30, 30 through the tubular portion 75, so as to prevent the brake rotor 76 from rotating relative to the shaft members 30.

The connecting member 74 is formed by sintering to form the brake rotor 76 in one piece. A brake shoe 92 and a brake pad 93, that are of friction members and act as pressing parts constituting a braking force generator 91 of the brake system 90, are disposed to face the axially opposite sides of the brake rotor 76. When the brake rotor 76 is pressed by the brake shoe 92 and the brake pad 93 from the axially opposite sides, braking torque is applied to the brake rotor 76 to stop the input shaft 60 and the motor shaft 72 from rotating.

Specifically, the brake system 90 includes the brake rotor 76 and the braking force generator 91. The brake rotor 76 is located in a brake rotor receiving area S3 defined in the brake chamber S2. The brake rotor receiving area S3 is constituted by a circular depression 101 sized to be slightly larger than the outer diameter and thickness of the brake rotor 76 and formed on one sidewall surface T1 of the intervening wall 47 defining the brake chamber S2, and the brake rotor 76 is disposed inside the depression 101.

Figure 8:
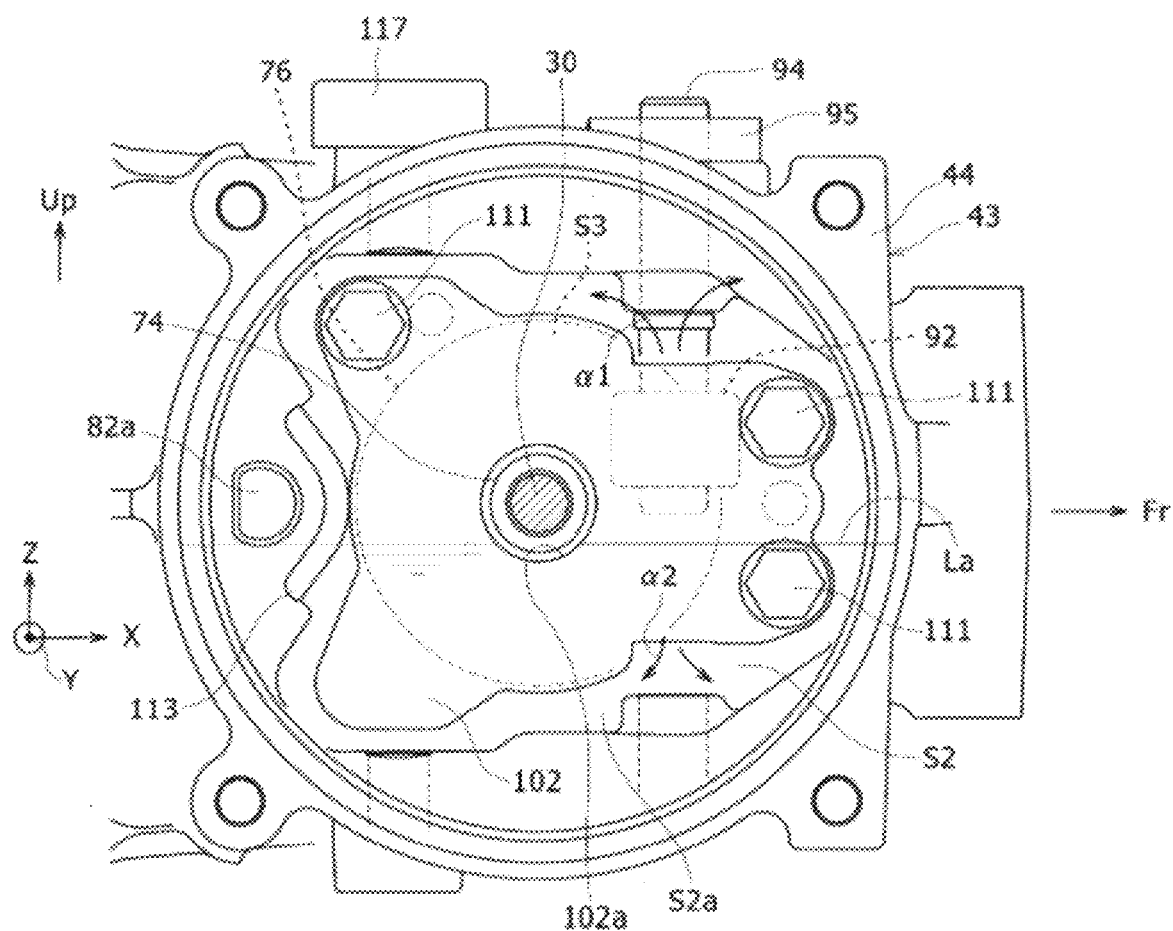
FIG. 8 is a sectional view taken along line D-D of FIG. 4.

Braking force is applied to the brake rotor 76 from the braking force generator 91. The braking force generator 91 includes a brake shaft 94, the brake shoe 92, the brake pad 93, and a brake arm 95 (FIG. 8). The brake pad 93 is held in a pocket formed on one sidewall surface T1 and located within the depression 101.

Figure 9:
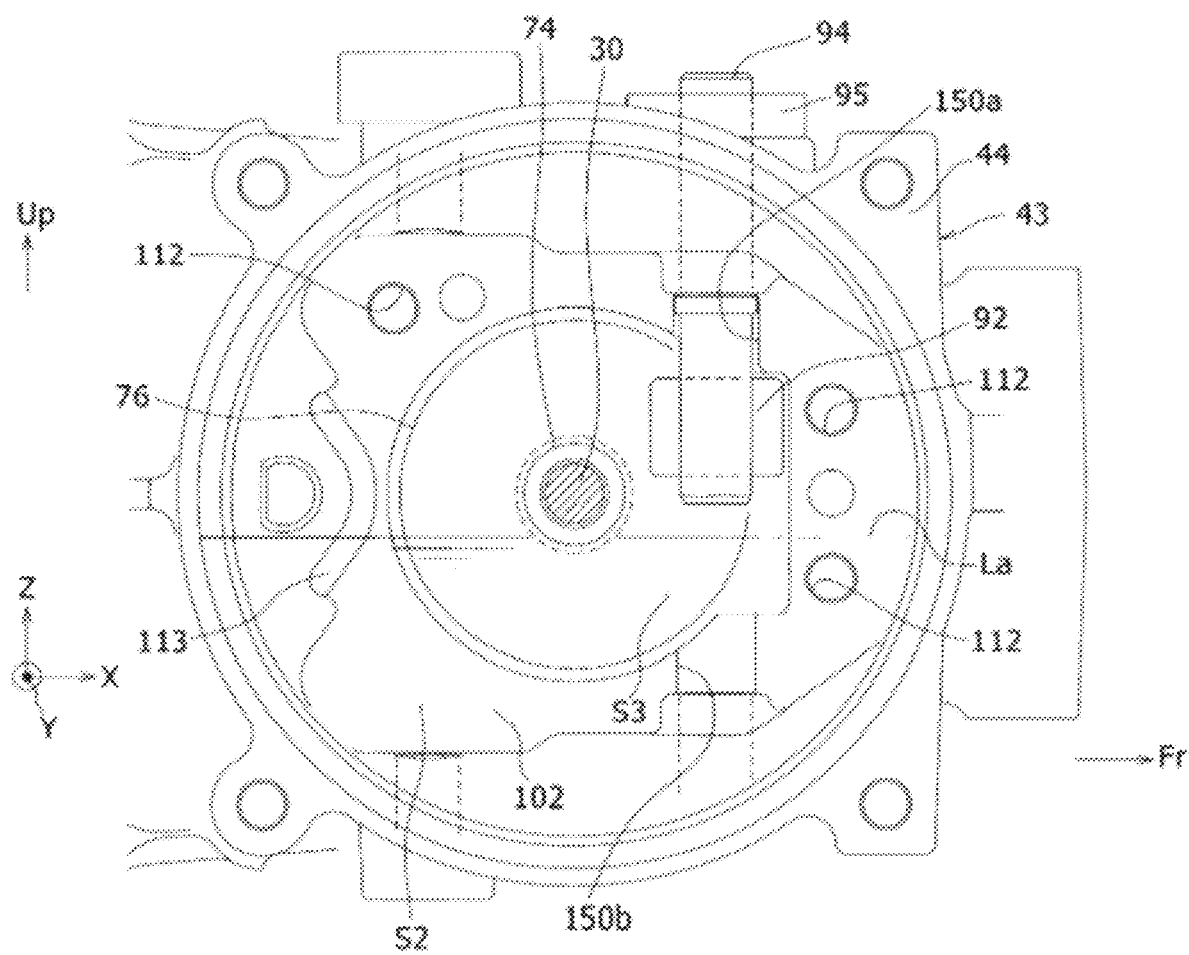
FIG. 9 is an illustration corresponding to FIG. 8, with a brake holder omitted.
Figure 10:
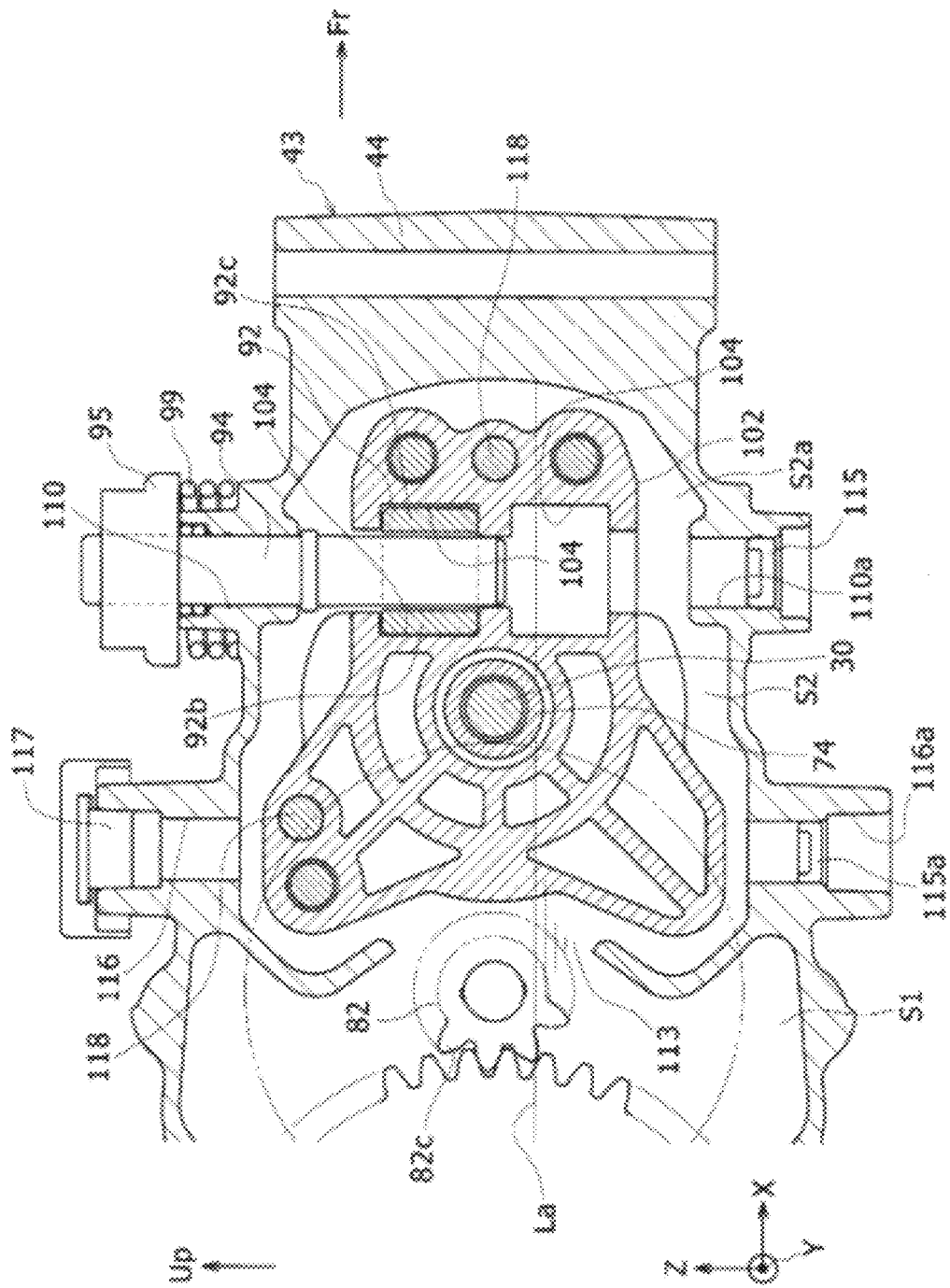
FIG. 10 is a sectional view taken along line E-E of FIG. 4.
Figure 11:
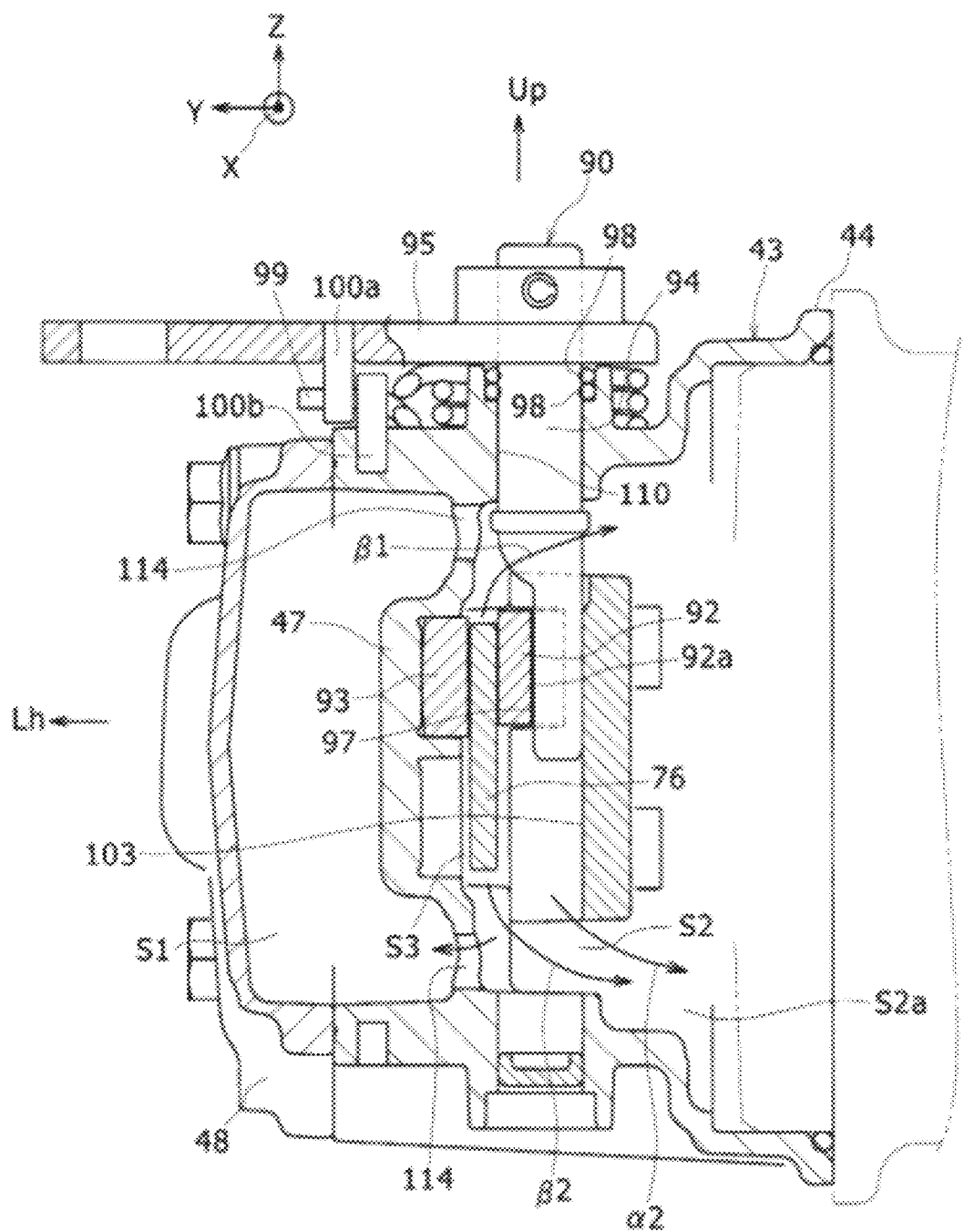
FIG. 11 is a sectional view taken along line F-F of FIG. 4.

FIG. 8 is a sectional view taken along line D-D of FIG. 4. FIG. 9 is an illustration corresponding to FIG. 8, with a brake holder omitted. FIG. 10 is a sectional view taken along line E-E of FIG. 4. FIG. 11 is a sectional view taken along line F-F of FIG. 4.

The brake shaft 94 extends vertically at the upper portion of the gear case 43 and is rotatably supported on the gear case 43. As depicted in FIGS. 10 and 11, the upper portion of the brake shaft 94 protrudes outward from the topside surface of the first case 44 of the gear case 43. Specifically, as depicted in FIG. 11, a through hole 110 to which the brake shaft 94 is fitted is formed in the top end portion of the first case 44 positioned to coincide in the longitudinal direction with a circumferential part of the brake rotor 76. The upper part of the through hole 110 is larger in diameter than the lower part thereof, and an O-ring 98 is provided inside the upper part to maintain oil tightness.

Figure 13:
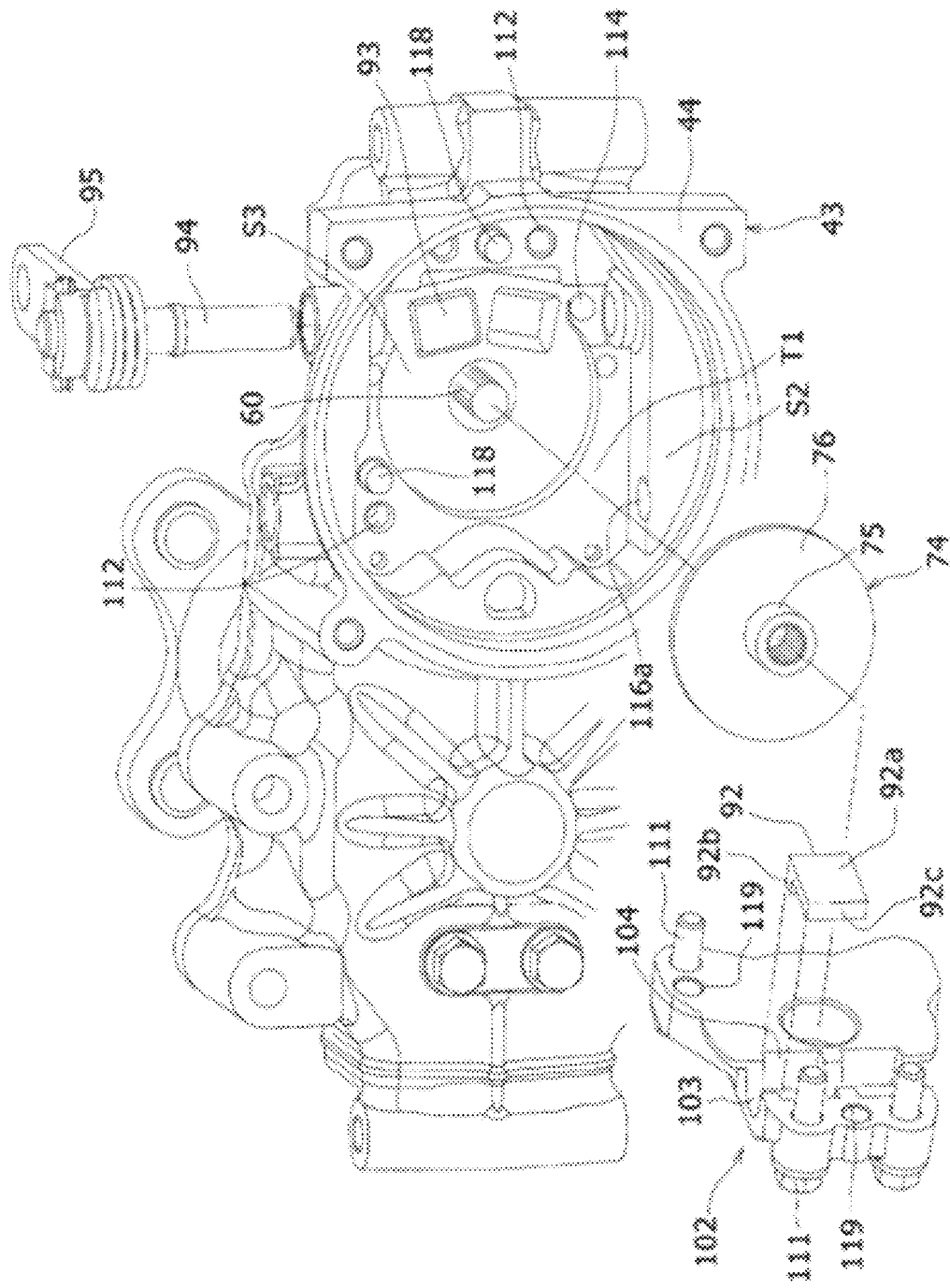
FIG. 13 is an exploded perspective view of the power transmission unit of FIG. 12.

On the other hand, the lower portion of the brake shaft 94 that passes through the brake chamber S2 and reaches into the brake rotor receiving area S3 is provided with a semi-circular part as seen in a cross-section, the part having a cam surface 97. In this connection, apertures 150a and 150b (FIG. 9) into which the lower portion of the brake shaft 94 can be inserted are formed in the aforementioned sidewall surface T1 in a manner as to be divided into top and bottom sections. Each of the apertures 150a, 150b extends in the same direction as the longitudinal axis of the brake shaft 94 and leads to the depression 101. The brake shaft 94 is inserted into only the topside aperture 150a of the apertures 150a, 150b. The bottom aperture 150b will be used in a state where the gear case is reversed upside down to be used for the right wheel and the aperture 150b is displaced into the top side, in an application wherein the gear case is shared for right and left mechanism as described later. The cam surface 97 faces the brake shoe 92 that is movable in the axial direction of the gear case 43. The brake shoe 92 is positioned between the brake shaft 94 and the brake rotor 76 and provided with a braking surface that faces the brake rotor 76. As depicted in FIG. 13, the brake shoe 92 has a shape in which two legs 92b and 92c protrude away from the brake rotor 76, from the front-back opposite ends of a plate-like body part 92a and is guided by the brake holder 102 as described below.

As depicted in FIG. 11, the brake pad 93 is mounted on the intervening wall 47 of the first case 44. When the cam surface 97 is positioned in parallel to the brake shoe 92, the brake shoe 92 is separated from the brake rotor 76 and a braking action becomes inoperative. On the other hand, when the brake shaft 94 rotates and the cam surface 97 comes into inclined with respect to the brake shoe 92, the cam surface 97 presses against the brake shoe 92 and the braking surface is raised out of the brake holder 102 while the brake shoe 92 is guided by the brake holder 102. Consequently, the brake rotor 76 is pressed toward the brake pad 93 and is sandwiched between the brake shoe 92 and the brake pad 93 on both sides, so that the brake rotor 76 as well as a transmission system transmitting a power from the input shaft 60 to the wheel 24 are subjected to a braking action.

As depicted in FIG. 11, the brake arm 95 is fixedly attached to the top end of the brake shaft 94 so as to extend in a direction perpendicular to the brake shaft 94. The bottom ends of the control levers 34, 36 (FIG. 1) are mechanically or electronically connected to the distal end of the brake arm 95 via a link mechanism (not depicted) or an electric actuator. A spring 99 is disposed between the brake arm 95 and the outer surface of the gear case 43 at a position around the brake shaft 94. The spring 99 is engaged at the respective ends thereof with a first engagement pin 100a secured to the brake arm 95 and protruding downward therefrom and a second engagement pin 100b secured to the gear case 43 and protruding upward therefrom. Consequently, the brake shaft 94 is urged in a first rotational direction by the spring 99 through the brake arm 95, so as to bring the cam surface 97 into parallel to the brake shoe 92 and keep the braking action in inoperative.

When the control lever 34, 36 of the lawn mowing vehicle 10 is shifted to the parking brake position, the distal end of the brake arm 95 moves against the urging force of the spring 99 and the brake shaft 94 rotates in a second rotation direction, so as to bring the cam surface 97 into inclined with respect to the brake shoe 92 and press the brake shoe 92 against the brake rotor 76. The second rotation direction is opposite to the first rotation direction. Consequently, the brake system 90 comes into a braking condition, in which the rotations of the brake rotor 76 and the wheel 24 come to a stop and the stopped state is maintained.

On the other hand, a brake holder 102 fixed to the gear case 43 is disposed opposite to the brake shoe 92 with respect to the brake shaft 94. The brake holder 102 is provided to enable the brake shoe 92 and the brake pad 93 to be pressed more stably against the brake rotor 76 and thereby accomplish a more stable braking action.

Figure 12:
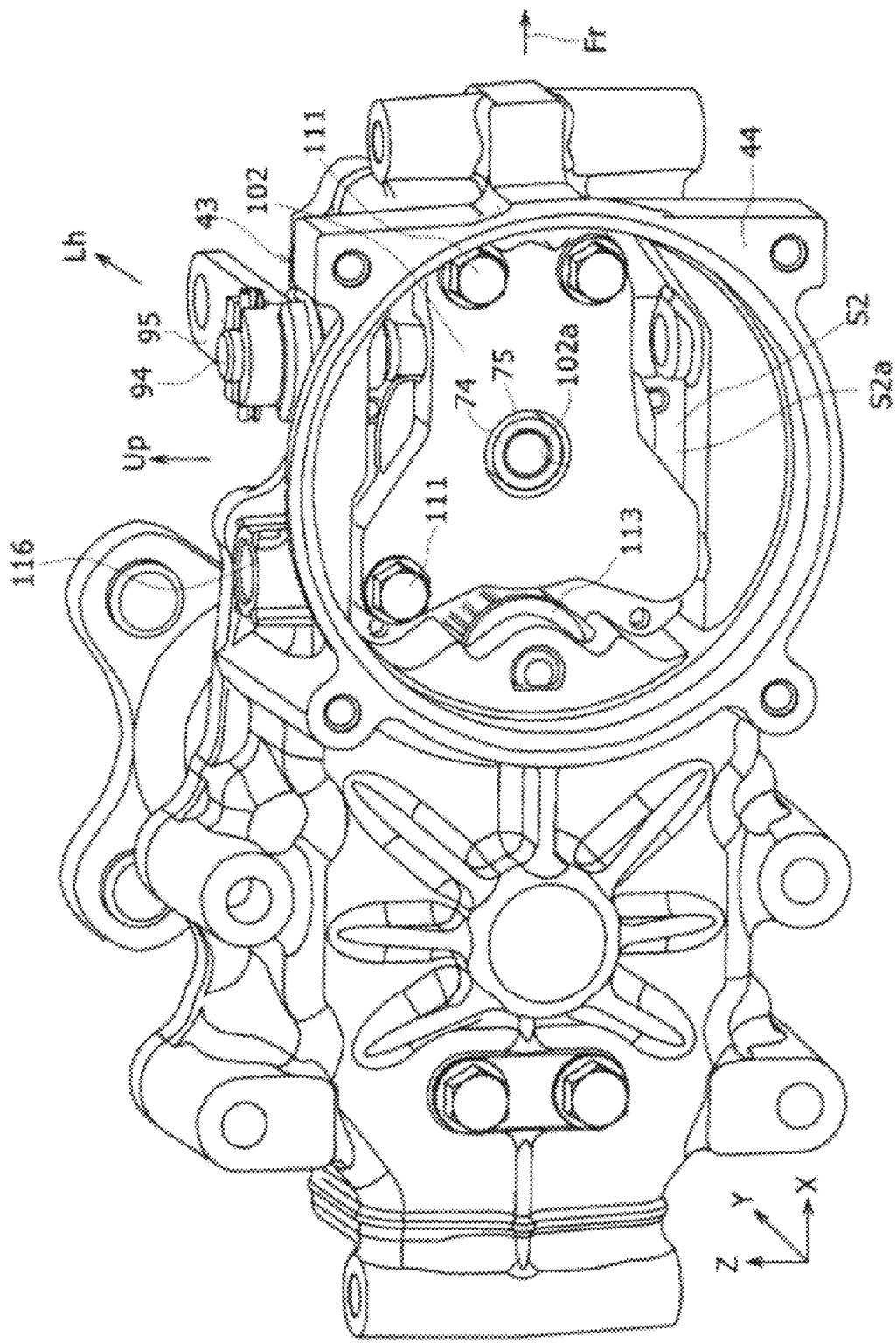
FIG. 12 is a perspective view of the power transmission unit of FIG. 2, with a motor and a motor case removed, and viewed from a motor side.

FIG. 12 is a perspective view of the power transmission unit of FIG. 2, with the motor and the motor case removed, and viewed from a motor side. FIG. 13 is an exploded perspective view of the power transmission unit of FIG. 12. The brake holder 102 is made from a metal material such as iron, steel, aluminum alloy, etc. As depicted in FIGS. 12 and 13, the brake holder 102 is provided at a generally center thereof with a central aperture 102a as a through hole through which the tubular portion of the connecting member 74 is inserted. As depicted in FIG. 13, the brake holder 102 is provided on one (or front) side in a thickness direction thereof with a guide face 103 shaped in a circular arc in cross section and extending in the vertical direction, a part of the brake shaft 94 capable of entering into the guide face from the upper side. Two pairs of grooves 104 are formed on the guide face 103 at locations spaced from each other in the vertical direction, each leg of the brake shoe 92 capable of being caught and held in each groove 104.

As depicted in FIGS. 4 and 12, the brake holder 102 is provided at the front center thereof with the central aperture 102a through which the motor shaft 72 and the tubular portion 75 are inserted. The brake holder 102 is fixed to the gear case 43 by bolts 111 that penetrate through one of two extension parts extending upward and downward at the rear end portion of the brake holder and through the front end portion of the brake holder, the bolts 111 being screwed respectively into threaded holes 112 (FIG. 13) formed in the sidewall surface T1. The brake holder 102 is disposed opposite to the brake shoe 92 with respect to the brake shaft 94 and is fixed to the gear case 43. Furthermore, the brake holder 102 is provided with the guide face 103 that receives the bottom end portion of the brake shaft 94 and contacts the semi-circular arc surface thereof opposite to the cam surface 97 and is configured to receive the reaction force of the brake shaft 94 against the brake shoe 92 at the guide face 103 when the braking action is applied.

In order to configure the above disc-brake mechanism as a wet type having good durability, the oil in the gear chamber S1 also enters into the brake chamber S2 through a first oil passage 113 (FIGS. 8 to 10) and a second oil passage 114 (FIG. 11), both formed in and penetrating the intervening wall 47, the first oil passage 113 being vertically elongated across the oil level "La" and the second oil passage 114 being located below the oil level "La". Consequently, the oil is also contained in the brake chamber S2 and the brake rotor 76 is subjected to an oil bath, so that heat generated during the braking action is dissipated through the oil.

When the motor shaft 72 rotates, the brake rotor 76 also rotates and may churn up the oil in the brake chamber S2, which may result in resistance to stirring and cause energy loss in the power transmission unit 41. Therefore, in the embodiment, the brake holder 102 is put over the front side of the depression 101 with the backside flat face of the brake holder butted to the sidewall surface T1 at a periphery of the opening of the depression 101, so that the brake rotor receiving area S3 is separated from a motor adjacent area S2a that is a space other than the brake rotor receiving area S3 in the brake chamber S2. Consequently, it is possible to restrict the amount of oil in contact with the brake rotor 76, and thus reduce the churning amount of oil. Therefore, it is possible to decrease the resistance to stirring the oil due to the brake rotor 76, and thus to reduce the energy loss in the power transmission unit 41.

The depression 101 is opened to the motor adjacent area S2a of the brake chamber S2 through the top and bottom apertures 150a, 150b into which the lower end portion of the brake shaft 94 is inserted as described above. Consequently, when the brake rotor 76 rotates, the surrounding oil blows out from the opened section of the brake rotor receiving area S3 into the motor adjacent area S2a of the brake chamber S2 due to centrifugal action, in a direction of, e.g., arrows α1, α2 in FIG. 8 or arrows β1, β2 in FIG. 11. The blown oil merges with the oil in the motor adjacent area S2a. The oil blowing out creates a nearly negative pressure in the brake rotor receiving area S3, whereby the oil in the motor adjacent area S2a is drawn through a gap between the inner periphery of the central aperture 102a and the outer periphery of the connecting member 74 into the brake rotor receiving area S3, so as to allow the oil easy to circulate while contacting the brake rotor 76, and facilitate the heat dissipation of the brake rotor 76. In this example, as described below, the top and bottom apertures 150a, 150b are formed so as to allow the gear case to be reversed upside down and shared for right and left power transmission units. However, if the sharing is not considered, the aperture 150b may be omitted.

Also in this example, the gear case 43 is shaped symmetrically with respect to the vertical center so as to allow the upside-down reversal use. Consequently, as depicted in FIG. 10, the first case 44 is provided with a bottom through hole 110a at a lower end position aligned in the vertical direction with the top through hole 110 to which the brake shaft 94 is fitted, the position of the bottom through hole corresponding to the position of the top through hole with respect to the longitudinal and horizontal directions, which ensures the symmetric property of the gear case 43 with respect to the vertical center. The bottom through hole 110a is clogged by a plug 115. The shape of the upper and lower end portions of the first case 44 provided respectively with the top and bottom through holes 110, 110a is also symmetrical with respect to the vertical center. When the vertical orientation of the gear case 43 is reversed, the bottom through hole 110a in FIG. 10 is displaced into the top side and the brake shaft 94 can be inserted therein, and the top through hole 110 in FIG. 10 is displaced into the bottom side and the plug 115 can be attached thereto. As depicted in FIG. 11, the intervening wall 47 is also provided with a second oil passage 114 at the upper side, so as to be symmetrical with the lower second oil passage 114 located below the oil level "La". Holes retaining the brake pad 93 and the brake shoe 92 are also provided at vertically symmetrical positions on the sidewall surface T1 and the brake holder 102, respectively, which allows the brake pad 93 and the brake shoe 92 to be repositioned when the gear case 43 is reversed upside down. Consequently, it is possible to share the single power transmission unit 41 with the gear case 43 reversed upside down, so as to be used for driving the right and left wheels.

Furthermore, in the brake chamber S2 of the first case 44, a pair of case through holes 116, 116a are formed in top and bottom end portions located at the rear of the through holes 110, 110a to vertically penetrate therethrough, at positions aligned vertically, so as to be symmetrical with respect to the vertical center. An air breather 117 is inserted into and attached to the outer end opening of the case through hole 116 positioned topside. The air breather 117 is provided to prevent dust, liquid such as water, etc., from entering into the gear case 43, and also to enable air intake and exhaust of the gear case 43. When the internal pressure of the gear case 43 increases due to oil expansion therein, air is discharged out of the gear case 43 through the air breather 117, so that it is possible to prevent an excessive increase in the internal pressure. The case through hole 116a positioned bottom side is clogged by a plug 115a. The case through holes 116, 116a are also shaped symmetrically with respect to the vertical center of the gear case 43. Consequently, when the vertical orientation of the gear case 43 is reversed, the bottom through hole 116a in FIG. 10 is displaced into the top side and the air breather 117 can be installed thereto, and the top through hole 116 in FIG. 10 is displaced into the bottom side and the plug 115a can be attached thereto.

Furthermore, the brake holder 102 is shaped symmetrically with respect to the vertical center, and the part extending upward at the rear end portion of the brake holder faces the inner end of the case through hole 116 via a gap. Consequently, it is possible to prevent the oil in the brake chamber S2 from scattering to enter deep within the case through hole 116. Therefore, it is possible to ensure the long-term reliability of the air breather 117. In order to ensure the effect of the upside-down reversal of the gear case 43, the part extending downward at the rear end portion likewise faces the inner end of the case through hole 116a via a gap.

When the brake holder 102 is installed in the brake chamber S2, the motor case joint surface of the first case 44 depicted in FIG. 13 is turned to face up, then the input shaft 60 and the brake pad 93 are assembled to the first case 44, and the tubular portion 75 of the connecting member 74 is fitted to one end of the input shaft 60 through the motor side opening of the first case 44. Next, the brake shoe 92 is temporarily placed on the brake rotor 76, and the cam surface 97 of the brake shaft 94 inserted into the brake chamber S2 is fitted to the brake shoe 92. Thereafter, the brake holder 102 is assembled to sandwich the brake rotor 76 between the brake holder 102 and the first case 44. In this respect, a plurality of locator pins 118 protrude in the vehicle horizontal direction from the sidewall surface T1 facing the brake holder 102. The brake holder 102 is provided on the surface facing the gear case 43 with circular recesses 119 at positions capable of being aligned with the tips of the locator pins 118, and the locator pins 118 are fitted to the circular recesses 119, so that the brake holder 102 is temporarily secured. In this state, the bolts 111 penetrating through the brake holder 102 are screwed respectively into the threaded holes 112 of the gear case 43, and thereby the brake holder 102 is secured to the gear case 43.

According to the power transmission unit 41 described above, the first helical gear 81 on the input shaft 60 and the second helical gear 83 meshing with the first helical gear 81 constitute the helical gear train, so that it is possible to improve the quiet performance of the gear mechanism 80. Further, the brake rotor 76 is integrally provided on the outer periphery of the connecting member 74 fitted to the motor shaft 72 and the input shaft 60. Thus, it is possible to prevent the overall length of the connecting portion of the motor shaft 72 and the input shaft 60 from increasing. Consequently, it is possible to prevent the size of the power transmission unit 41 from increasing when the brake rotor 76 is installed around the input shaft 60. In addition, it is possible to prevent workability from being considerably deteriorated in comparison with a configuration in which a motor shaft and an input shaft are integrally formed and a helical gear is formed thereon.

The gear mechanism 80 includes the second helical gear 83 meshing with the first helical gear 81, and the intermediate gear shaft 82 engaged to the inner periphery of the second helical gear 83, the intermediate gear shaft 82 axially displaceable but non-rotatable relative to the second helical gear 83. A pair of thrust receiving members 121, 124 made from a material having higher hardness than a material of the gear case 43 and supported in a non-rotatable manner relative to the gear case 43 are provided on the case portions facing the axial one and other end surfaces of the second helical gear 83. Consequently, when the second helical gear 83 is axially displaced relative to the intermediate gear shaft 82 due to a meshing action in the helical gear train, it is possible to prevent the second helical gear 83 from butting against the gear case 43 accommodating the second helical gear 83 to make a frictional contact, so that it is possible to prevent the gear case 43 from being worn.

Furthermore, one end of the intermediate gear shaft 82 is inserted into and supported on the wall of the second case 48, and one of the pair of thrust receiving members 121, 124 has a plate-shaped body portion that is fitted to one end of the intermediate gear shaft 82 and interposed between the second case 48 and the second helical gear 83. Consequently, it is not necessary to provide a special machining or a dedicated component for supporting the thrust receiving member 121 on the second case 48.

In addition, the brake chamber S2 is provided with the brake rotor 76, the brake shoe 92, and the brake holder 102 fixed to the gear case 43 and disposed opposite to the brake shoe 92 with respect to the brake shaft 94, the brake holder 102 receiving the reaction force of the brake shaft 94 against the brake shoe 92. Consequently, it is possible to realize a configuration in which the rotatable brake shaft 94 stably presses the brake shoe as a friction member against the brake rotor 76. Thus, it is possible to accomplish a more stable braking action.

Since the brake holder 102 and the gear case 43 are shaped symmetrically with respect to the vertical center, it is possible to share components having identical structures to be used for the right wheel and the left wheel. The components used for the right wheel and the left wheel have a similar configuration except that a vertical positioning is reversed, in which the brake shaft 94 and the air breather 117 are mounted on the upper end portion of the gear case 43, and the plug is attached to the lower end portion of the gear case 43. Thus, it is possible to share the components and thereby reduce manufacturing cost.

Other Examples of Embodiment

Figure 14:
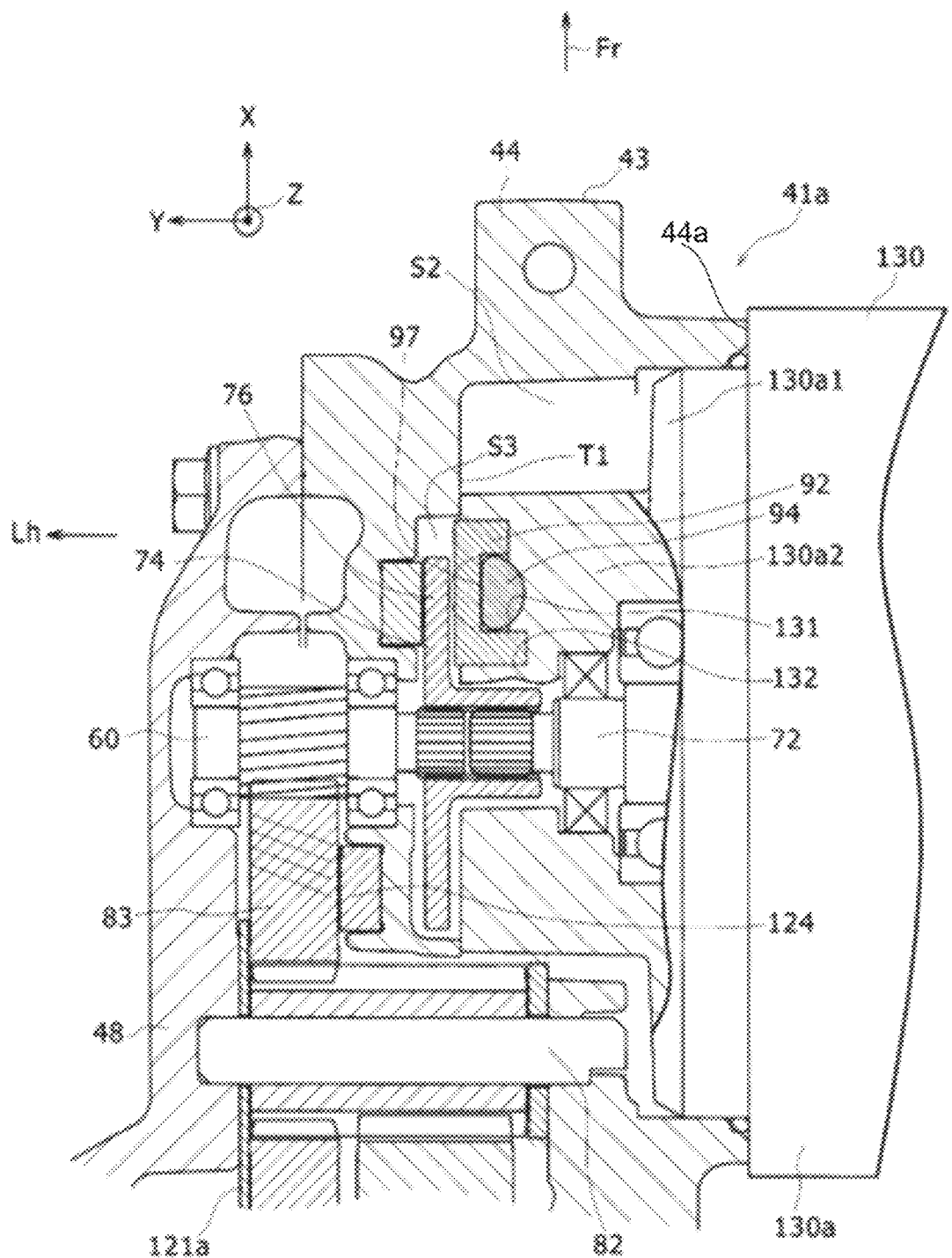
FIG. 14 is an illustration corresponding to FIG. 4 and depicts a power transmission unit according to another example of the embodiment of the present invention.

FIG. 14 is an illustration corresponding to FIG. 4 and depicts a power transmission unit 41a according to another example of the embodiment. In this exemplary configuration, a brake holder is configured by a part of a motor case 130 that protrudes into the gear case 43, the part also having the function of the brake holder. Specifically, the gear case 43 is provided with a mounting surface 44a for the motor case 130, the mounting surface 44a facing toward the same direction as the sidewall surface T1 of the brake chamber S2.

The motor case 130 is provided with a thick tubular portion 130a2 protruding axially toward the gear case 43 near the center of a spigot part 130a1 of a case body 130a. The protruding length is defined so that the distal end of the tubular portion 130a2 butts against the sidewall surface T1 when the motor case 130 is coupled to the first case 44 as depicted in FIG. 11. The mounting surface 44a may be the same surface as the sidewall surface T1 of the brake chamber S2. In this state, similar to the brake holder 102 of the embodiment depicted in FIG. 4, the end face of the tubular portion 130a2 is provided with a guide face 131, into which the lower end of the brake shaft 94 can enter and which contacts the semi-circular arc surface opposite to the cam surface 97, and a groove 132 formed at the open end of the guide face 131 to catch the brake shoe 92 and guide the axial movement of the brake shoe 92. Thus, the brake holder is formed by the portion of the end face of the tubular portion 130a2 of the motor case 130, which faces into the brake chamber S2 and opposes the brake shaft 94.

According to the configuration of this example, the brake holder is formed by the tubular portion 130a2 of the case body 130a of the motor case 130. Consequently, it is not necessary to provide a brake holder as a component separate from the motor case 130, and thus it is possible to decrease the number of components and thereby reduce the manufacturing cost of the power transmission unit 41a. In this example, the other configurations and actions are the same as those of the embodiment depicted in FIGS. 1 through 13.

Figure 15:
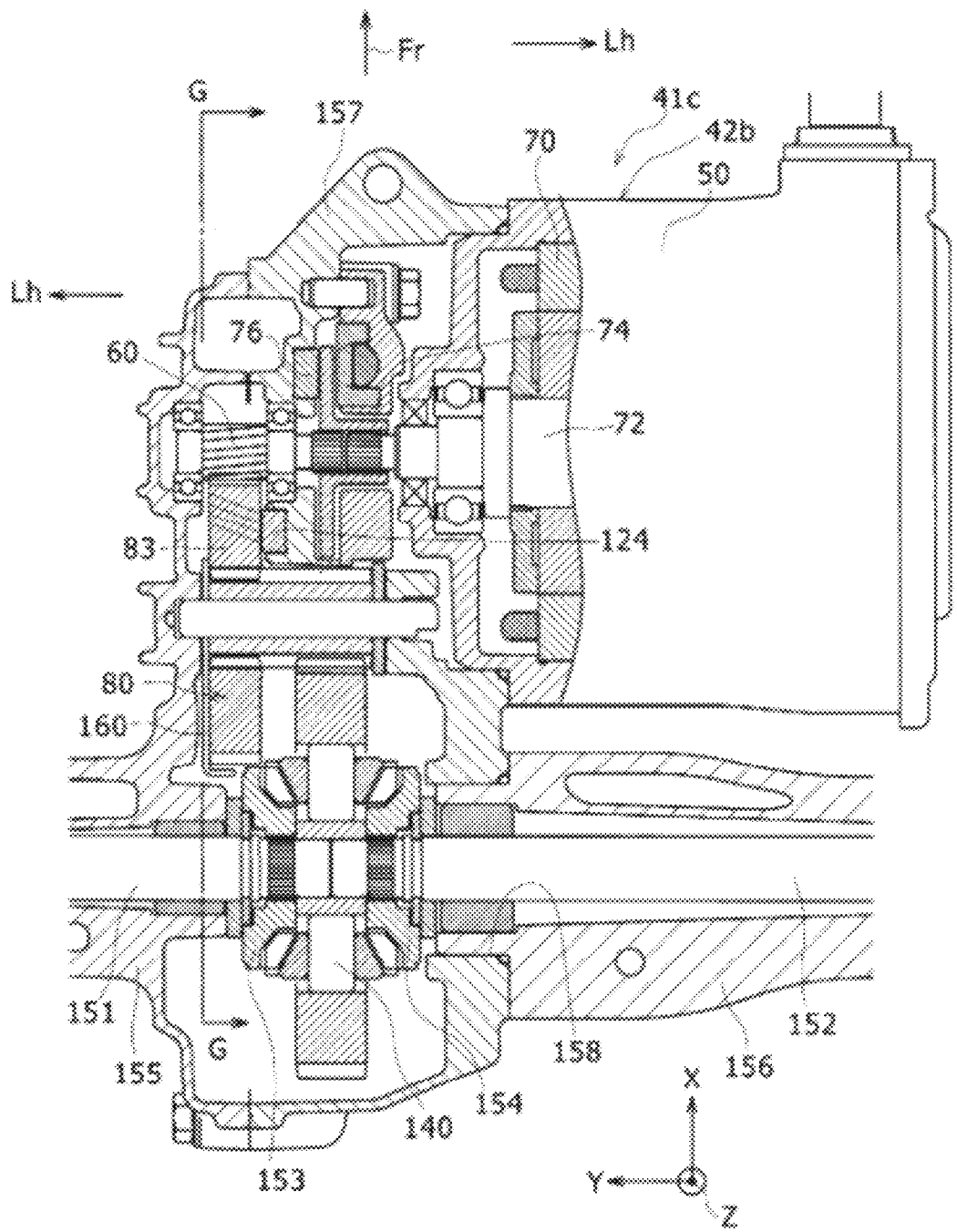
FIG. 15 is an illustration corresponding to FIG. 3 and depicts a power transmission unit according to a further example of the embodiment of the present invention.
Figure 16:
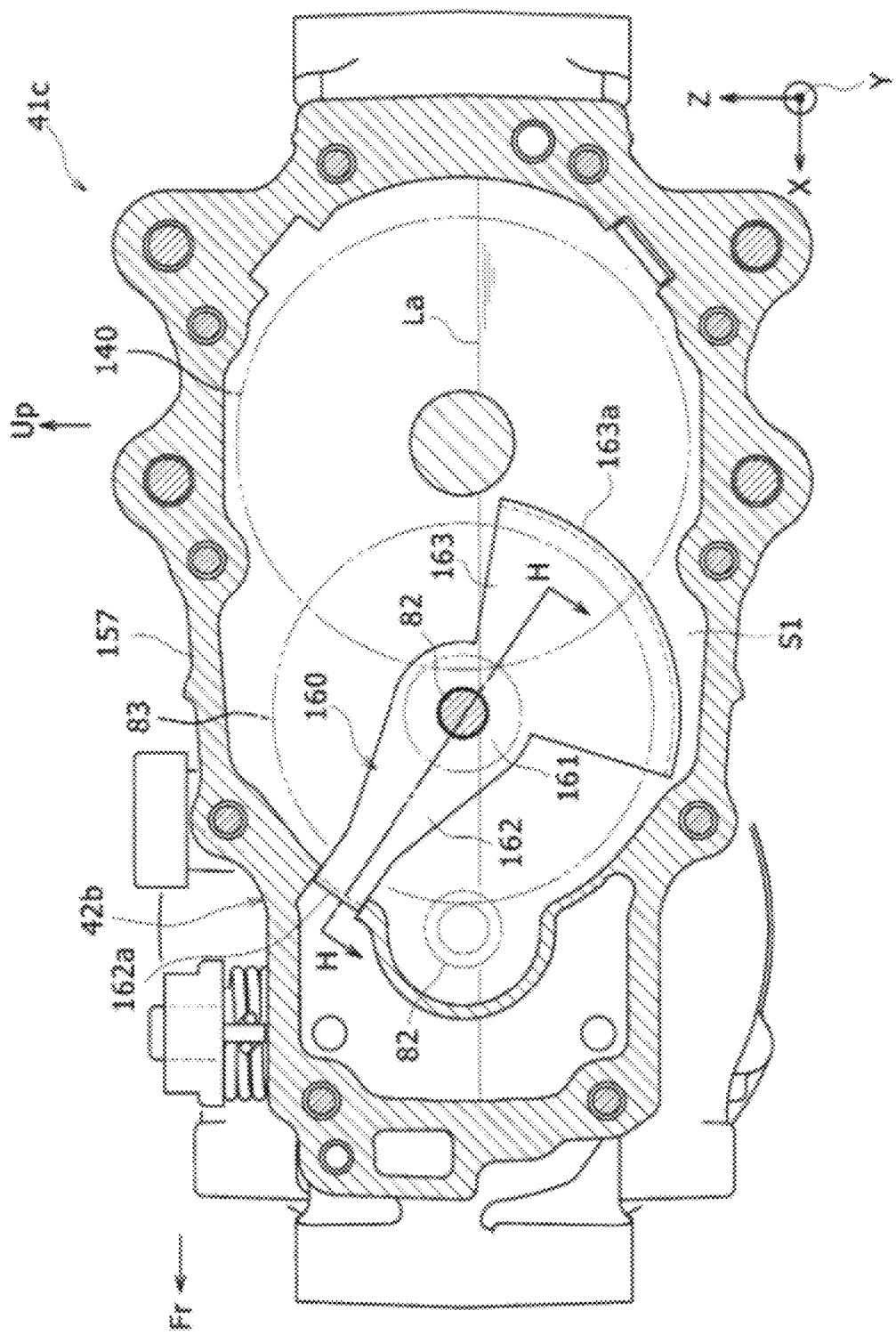
FIG. 16 is a sectional view taken along line G-G of FIG. 15.
Figure 17:
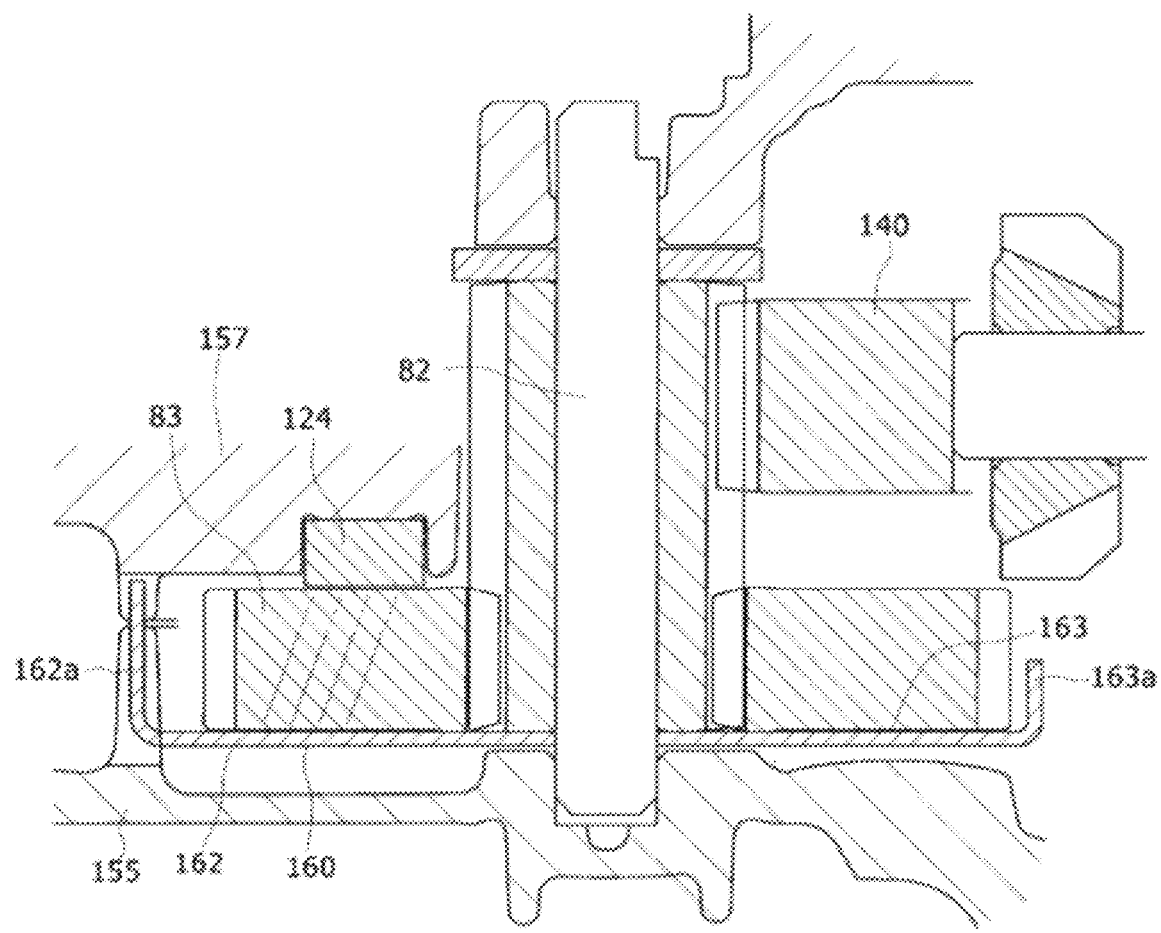
FIG. 17 is a sectional view taken along line H-H of FIG. 16.

FIG. 15 is an illustration corresponding to FIG. 3 and depicts a power transmission unit 41c according to a further example of the embodiment. FIG. 16 is a sectional view taken along line G-G of FIG. 15 FIG. 17 is a sectional view taken along line H-H of FIG. 16. In this exemplary configuration, a power transmission unit 41c is incorporated into a vehicle of the type in which a single electric traveling motor 70 drives right and left wheels on the rear side of the vehicle. In this vehicle, right and left wheels on the front side of the vehicle are steered by a steering mechanism including a steering handle. In this case, the steering handle is used as a steering device, and an accelerator pedal installed in front of a driver's seat is used as an accelerator device. The motor 70 is controlled so that the rotational speed of the motor 70 increases in response to the operation of the accelerator pedal.

In the power transmission unit 41c, the power of the motor shaft 72 of the motor 70 is transmitted through the input shaft 60, the gear mechanism 80, and a differential gear mechanism 140 to each of a first axle 151 and a second axle 152, which extend separately rightward and leftward. In the differential gear mechanism 140, the power is transmitted to side bevel gears 153 and 154 fixed to the axles 151 and 152 as right and left output shafts, so as to rotate the wheels fixed to the axles 151, 152.

In this example, a case 42b includes a first axle case 155 accommodating the first axle 151, a second axle case 156 accommodating the second axle 152, a first case 157 sandwiched and secured between the first axle case 155 and the second axle case 156, and the motor case 50 fixed to the first case 157. The first axle case 155 has a configuration similar to the second case 48 in each of the above exemplary configurations. In the first case 157, a through hole 158 is formed, to which one end portion of the second axle case 156 is fitted and fixed.

Furthermore, one thrust receiving member 160 of a pair of thrust receiving members 160, 124 facing the opposite end faces of the second helical gear 83 is provided with, as depicted in FIGS. 16 and 17, a body portion 161 having a disk plate shape, a part of which is fitted to the intermediate gear shaft 82, and two extensions 162, 163 extending from the part of the body portion 161 toward the outer periphery of the second helical gear 83 in radially opposite directions. One extension 162 extends diagonally upward and the other extension 163 extends diagonally downward. The extension 162 is provided, like one thrust receiving member 121a of the configuration depicted in FIGS. 1 to 13, with a bent portion 162a at the outer end in the extending direction, and the bent portion 162a is caught in a part of the case 42b.

The other extension 163 is shaped like a sector and has width gradually increasing outward in the extending direction. The extension 163 has a second bent portion 163a on a peripheral edge portion extending outwardly beyond an outer periphery of the second helical gear 83, which is the outer end portion of the extension 163 in the extending direction, the second bent portion 163a being bent along the tooth width of the second helical gear 83. The second bent portion 163a is positioned opposite to a part of the outer circumferential surface of the second helical gear 83. Therefore, the second bent portion 163a is larger in circumferential length than the bent portion 162a of the extension 162 and spans a range from the bottom of the case to a neighborhood of the oil level, in the gear chamber S1 containing oil.

According to the configuration of this example, the second bent portion 163a of the non-rotatable thrust receiving member 160 is disposed to face a part of the outer circumferential surface of the second helical gear 83 at the lower side thereof. Consequently, in a configuration that the oil is contained in the case 42b, it is possible to suppress the energy loss of the power transmission unit 41c from increasing due to resistance to stirring, applied from the oil to the second helical gear 83 and other gears, when the oil is stirred by the rotation of the second helical gear 83. In this example, the other configurations and actions are the same as those of the embodiment depicted in FIGS. 1 through 13.

The configuration of the thrust receiving member 160 used in this exemplary configuration may also be applied to the configurations of FIGS. 1 through 13 or FIG. 14.

The configuration of each of the above examples may be modified in such a manner that only one of the gear shaft and the motor shaft acts as a shaft member and the brake rotor is fitted to the outside of the shaft member to be prevented from rotating relative to the shaft member. Alternatively, the configuration may be modified in such a manner that the gear shaft and the motor shaft are integrated into a single shaft member and the brake rotor is fitted to the outside of the shaft member to be prevented from rotating relative to the shaft member.

REFERENCE SIGNS LIST 10 lawn mowing vehicle
16 main frame
17 driver's seat
18, 20 caster
24 wheel
25 mower
26 mower deck
28 electric mowing motor
30 shaft member
40 power supply unit
41 power transmission unit
42 transmission housing
43 gear case
44 first case
44a mounting surface
45 through hole
46 recess
47 intervening wall
48 second case
49 tubular portion
50 motor case
51, 52, 53 bearing
54 seal
58 bolt
60 input shaft (gear shaft)
62 hub
70 electric traveling motor
72 motor shaft
74 connecting member
75 tubular portion
76 brake rotor
80 gear mechanism
81 first helical gear
82 intermediate gear shaft
83 second helical gear
84 output gear
90 brake system
91 braking force generating mechanism
92 brake shoe
93 brake pad
94 brake shaft
95 brake arm
98 O-ring
99 spring
101 depression
102 brake holder
103 recess
104 groove
110, 110a through hole
111 bolt
112 threaded hole
113 first oil passage
114 second oil passage
115, 115a plug
116, 116a case through hole
117 air breather
118 locator pin
119 recess
120 output shaft

The invention claimed is:

1. A power transmission unit that includes an electric motor with a motor shaft, a gear mechanism, and an output shaft, which are accommodated in a gear case, in which power of the motor shaft is transmitted to the output shaft via the gear mechanism; the gear mechanism comprising:
   an input shaft rotatably supported on the gear case, and a first helical gear provided on the input shaft;
   a connecting member provided with a tubular portion fitted to the motor shaft and the input shaft so as to allow the motor shaft and the input shaft to synchronously rotate, wherein
   the connecting member is integrally provided on the outer periphery thereof with a brake rotor,
   a brake chamber defined inside the case and accommodating the brake rotor;
   a friction member disposed at one side of the brake rotor and capable of contacting with and separating from the brake rotor;
   a brake shaft rotatably supported on the case at a side opposite to the brake rotor with respect to the friction member, the brake shaft provided with a cam surface capable of pressing the friction member toward the brake rotor;
   a brake holder fixed to the case and disposed opposite to the friction member with respect to the brake shaft, the brake holder receiving reaction force of the brake shaft when the cam surface acts to press the friction member;
   a through hole provided on an upper side of the brake chamber; and
   an air breather attached to an outer end opening of the through hole; wherein
   a part of the brake holder is opposed to an inner end opening of the through hole with a gap therebetween.

2. The power transmission unit of claim 1, wherein the gear mechanism includes:
   a second helical gear meshing with the first helical gear; and
   an intermediate gear shaft engaged with an inner periphery of the second helical gear, the intermediate gear shaft being axially displaceable relative to the second helical gear and non-rotatable relative to the second helical gear;
   a pair of thrust receiving members provided at portions of the case so as to face axial one and other end surfaces of the second helical gear and supported on the case in a non-rotatable manner, the thrust receiving members being made of a material harder than a material of the case.

3. The power transmission unit of claim 2, wherein one end of the intermediate gear shaft is inserted into and supported on a wall of the case; and
   one of the pair of thrust receiving members has a plate-shaped body portion that is fitted to the one end of the intermediate gear shaft and interposed between the case and the second helical gear.

4. The power transmission unit of claim 3, wherein the one of the pair of thrust receiving members has a bent portion bent toward the second helical gear on a peripheral edge portion extending outwardly beyond an outer periphery of the second helical gear; and the bent portion is disposed opposite to a part of an outer peripheral surface of the second helical gear.

5. A power transmission unit that includes an electric motor with a motor shaft, a gear mechanism, and an output shaft, which are accommodated in a gear case, in which power of the motor shaft is transmitted to the output shaft via the gear mechanism; the gear mechanism comprising:
- a brake rotor fitted to an outside of a shaft member in a non-rotatable manner relative to the shaft member, the shaft member being one or both of the motor shaft and a gear shaft of the gear mechanism;
- a friction member disposed at one side of the brake rotor and capable of contacting with and separating from the brake rotor;
- a brake shaft rotatably supported on the case and disposed opposite to the brake rotor with respect to the friction member, the brake shaft provided with a cam surface capable of pressing the friction member toward the brake rotor; and
- a brake holder fixed to the case and disposed opposite to the friction member with respect to the brake shaft, the brake holder receiving reaction force of the brake shaft when the cam surface acts to press the friction member;
- a brake chamber provided inside the gear case at a location where the gear shaft faces the motor shaft, the brake chamber forming a lubricating oil reservoir;
- a tubular portion fitted to the outside of the shaft member in a non-rotatable manner relative thereto, the brake rotor being integrally formed on an outer periphery of the tubular portion;
- a brake rotor receiving area formed on one sidewall surface of the case located inside the brake chamber, the brake rotor receiving area provided with a depression larger than an outer diameter of the brake rotor as well as an axial length of the tubular portion; and
- a through hole formed in the brake holder and having an inner diameter at least allowing the motor shaft to be inserted therethrough; wherein
the brake holder is mounted on the sidewall surface so as to cover the brake rotor receiving area, and
an outer periphery of the brake rotor receiving area is partially opened to the brake chamber through an aperture.

6. The power transmission unit of claim 5, further comprising:
- a motor case accommodating the motor, the gear case and the motor case being capable of separating from and joined to each other; and
- a mounting surface for the motor case, provided in the gear case and facing toward a same direction as a sidewall surface of the brake chamber; wherein
- a part of the motor case extending from the mounting surface into the brake chamber constitutes the brake holder.

7. A power transmission unit that includes an electric motor with a motor shaft, a gear mechanism, and an output shaft, which are accommodated in a gear case, in which power of the motor shaft is transmitted to the output shaft via the gear mechanism; the gear mechanism comprising:
- a brake rotor fitted to an outside of a shaft member in a non-rotatable manner relative to the shaft member, the shaft member being one or both of the motor shaft and a gear shaft of the gear mechanism;
- a friction member disposed at one side of the brake rotor and capable of contacting with and separating from the brake rotor;
- a brake shaft rotatably supported on the case and disposed opposite to the brake rotor with respect to the friction member, the brake shaft provided with a cam surface capable of pressing the friction member toward the brake rotor;
- a brake holder fixed to the case and disposed opposite to the friction member with respect to the brake shaft, the brake holder receiving reaction force of the brake shaft when the cam surface acts to press the friction member:
- a brake chamber;
- a through hole provided on an upper side of the brake chamber; and
- an air breather attached to an outer end opening of the through hole; wherein
- a part of the brake holder is opposed to an inner end opening of the through hole with a gap therebetween.

* * * * *